United States Patent
Takakura et al.

(10) Patent No.: US 11,190,995 B2
(45) Date of Patent: Nov. 30, 2021

(54) USER EQUIPMENT, AMF, CORE NETWORK APPARATUS, P-CSCF, AND COMMUNICATION CONTROL METHOD

(71) Applicants: SHARP KABUSHIKI KAISHA, Sakai (JP); FG Innovation Company Limited, Tuen Mun (HK)

(72) Inventors: Tsuyoshi Takakura, Sakai (JP); Shuichiro Chiba, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/624,297

(22) PCT Filed: Jun. 19, 2018

(86) PCT No.: PCT/JP2018/023197
§ 371 (c)(1),
(2) Date: Dec. 19, 2019

(87) PCT Pub. No.: WO2018/235791
PCT Pub. Date: Dec. 27, 2018

(65) Prior Publication Data
US 2020/0128460 A1    Apr. 23, 2020

(30) Foreign Application Priority Data
Jun. 19, 2017   (JP) .............................. JP2017-119513

(51) Int. Cl.
*H04W 36/12* (2009.01)
*H04W 76/50* (2018.01)
(Continued)

(52) U.S. Cl.
CPC ............ *H04W 36/12* (2013.01); *H04W 36/16* (2013.01); *H04W 76/50* (2018.02); *H04W 84/042* (2013.01)

(58) Field of Classification Search
CPC ...... H04W 36/12; H04W 76/50; H04W 36/16
(Continued)

(56) References Cited

U.S. PATENT DOCUMENTS

| | | | |
|---|---|---|---|
| 2009/0191841 A1 | 7/2009 | Edge et al. | ............ H04M 11/04 |
| | | | 455/404.1 |
| 2016/0337282 A1* | 11/2016 | Kallio | ..................... H04W 4/12 |

(Continued)

FOREIGN PATENT DOCUMENTS

| CN | 101873651 A | 10/2010 |
|---|---|---|
| CN | 101960818 A | 1/2011 |

(Continued)

OTHER PUBLICATIONS

"3rd Generation Partnership Project;Technical Specification Group Services and System Aspects;System Architecture for the 5G System;Stage 2(Release 15)" 3GPP TS 23.501 V1.0.0 (Jun. 2017).
(Continued)

*Primary Examiner* — Danh C Le
(74) *Attorney, Agent, or Firm* — Imperium Patent Works

(57) ABSTRACT

In an IMS emergency call connection of a call which a user equipment cannot recognize as an emergency call, a user equipment transmits to an IMS an IMS emergency call connection signal of the call which the user equipment cannot recognize as the emergency call, and in a case that a reject or redirection message indicating an emergency call connection is received from the IMS, the user equipment determines whether to transmit the IMS emergency call connection signal again to a core network to which the user equipment is connected or whether to transmit the IMS
(Continued)

emergency call connection signal again to another core network in the same PLMN. Accordingly, a user equipment, a core network apparatus, a control method to be performed by an IMS apparatus, and the like are provided for the user equipment to connect to a network suitable for an emergency call service in the 5th generation (5G) mobile communication system, which is a next-generation mobile communication system.

6 Claims, 15 Drawing Sheets

(51) Int. Cl.
    *H04W 36/16*       (2009.01)
    *H04W 84/04*       (2009.01)

(58) Field of Classification Search
    USPC .............................. 370/331; 455/436, 550.1
    See application file for complete search history.

(56) References Cited

U.S. PATENT DOCUMENTS

| | | | |
|---|---|---|---|
| 2017/0366955 A1* | 12/2017 | Edge | H04M 11/04 |
| 2018/0279113 A1* | 9/2018 | Yerrabommanahalli | H04W 8/02 |
| 2018/0376384 A1* | 12/2018 | Youn | H04W 36/0022 |
| 2019/0159090 A1* | 5/2019 | Keller | H04W 36/12 |
| 2020/0015128 A1* | 1/2020 | Stojanovski | H04W 36/0022 |
| 2020/0015130 A1* | 1/2020 | Wang | H04W 36/0016 |
| 2020/0037386 A1* | 1/2020 | Park | H04W 76/18 |
| 2020/0068481 A1* | 2/2020 | Kim | H04W 36/00 |
| 2020/0112522 A1* | 4/2020 | Dannebro | H04W 36/14 |
| 2020/0112894 A1* | 4/2020 | Koshimizu | H04W 36/0022 |
| 2020/0178139 A1* | 6/2020 | Shimojou | H04W 92/24 |
| 2020/0196232 A1* | 6/2020 | Drevo | H04W 76/27 |
| 2020/0267617 A1* | 8/2020 | Larsen | H04W 36/30 |
| 2020/0389829 A1* | 12/2020 | Zhu | H04W 36/12 |
| 2020/0413298 A1* | 12/2020 | Ke | H04W 4/90 |
| 2021/0022024 A1* | 1/2021 | Yao | H04W 36/0085 |
| 2021/0029603 A1* | 1/2021 | Kim | H04W 60/00 |
| 2021/0195490 A1* | 6/2021 | Rommer | H04W 36/14 |

FOREIGN PATENT DOCUMENTS

| | | |
|---|---|---|
| CN | 102138345 A | 7/2011 |
| WO | 2016/208768 A1 | 12/2016 |

OTHER PUBLICATIONS

"3rd Generation Partnership Project;Technical Specification Group Services and System Aspects;Procedures for the 5G System;Stage 2(Release 15)" 3GPP TS 23.502 V0.4.0 (May 2017).
"3rd Generation Partnership Project;Technical Specification Group Core Network and Terminals;Non-Access-Stratum (NAS) protocol for Evolved Packet System (EPS); Stage 3(Release 14)" 3GPP TS 24.301 V14.3.0 (Mar. 2017).
"3rd Generation Partnership Project;Technical Specification Group Services and System Aspects;General Packet Radio Service (GPRS) enhancements for Evolved Universal Terrestrial Radio Access Network (E-UTRAN) access (Release 14)" 3GPP TS 23.401 V14.4.0 (Jun. 2017).
"3rd Generation Partnership Project;Technical Specification Group Core Network and Terminals;IP multimedia call control protocol based on Session Initiation Protocol (SIP)and Session Description Protocol (SDP);Stage 3(Release 14)" 3GPP TS 24.229 V14.3.1 (Mar. 2017).
"3rd Generation Partnership Project;Technical Specification Group Services and System Aspects;IP Multimedia Subsystem (IMS);Stage 2(Release 14)" 3GPP TS 23.228 V14.4.0 (Jun. 2017).
Nokia, Alcatel-Lucent Shanghai Bell, "TS 23.501: Voice and emergency session support for 5G" 3GPP SA WG2 Meeting #121; S2-173417; May 15-19, 2017, Hangzhou, China; Introduction, Discussion, Sections 5. 16. 4.
"3rd Generation Partnership Project;Technical Specification Group Services and System Aspects;System Architecture for the 5G System;Stage 2(Release 15)" 3GPP TS 23.501 V1.0.0 (Jun. 2017); Sections 5. 16. 3. 2, 5. 16. 4.
"3rd Generation Partnership Project; Technical Specification Group Services and System Aspects; System Architecture for the 5G System; Stage 2 (Release 15)"; 3GPP TS 23.501,Jun. 1, 2017, vol. SA WG2, No. V0.5.0, pp. 1-145 * Section 6.2.1 *.
Office action of the European Patent Office in foreign related application EP18820565.2 dated May 10, 2021 (8 pages).
Technical Specification 3GPP TS 23.501 V0.5.0 (May 2017), "3rd Generation Partnership Project; Technical Specification Group Services and System Aspects; System Arch. for 5G System; Stage 2," Sophia Antipolis, France (Release 15) XP051298314 (145 pages).
Nokia et al., "TS 23.501: Voice and emergency session support for 5G," 3GPP SA WG2 Meeting #121 S2-173417, Release 5G_ph1/Rel-15, May 9, 2017, Hangzhou, China, XP051268864 (3 pages).
Office action of the Chinese Patent Office in foreign related application CN201880040784.7 dated May 31, 2021 (6 pages).

* cited by examiner

USER EQUIPMENT, AMF, CORE NETWORK APPARATUS, P-CSCF, AND COMMUNICATION CONTROL METHOD

TECHNICAL FIELD

The present invention relates to a user equipment, an AMF, a core network apparatus, a P-CSCF, and a communication control method. This application claims priority based on JP 2017-119513 filed on Jun. 19, 2017 in Japan, the contents of which are incorporated herein in its entirety by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE). The 3GPP is in the process of standardizing Evolved Packet System (EPS) as a communication system for realizing an all-Internet Protocol (IP) architecture. Note that a core network constituting the EPS is called an Evolved Packet Core (EPC).

Also, in order to provide an emergency call service on an all-IP network, a system called IP Multimedia Subsystem (IMS) needs to be supported.

Additionally, the 3GPP has recently studied next-generation communication technologies and system architectures for a 5th generation (5G) mobile communication system which is a next generation mobile communication system, and in particular, has standardized a 5G system (5GS) as a system for realizing a 5G mobile communication system (see NPL 1 and NPL 2). In the 5GS, technical problems attributable to connection of various terminals to a cellular network are extracted to standardize solutions.

For example, specifications for a core network for supporting an emergency call service, optimization of the IMS, and the like have been studied (see NPL 1, NPL 2, and, NPL 5).

CITATION LIST

Non Patent Literature

NPL 1: 3GPP TS 23.501 v1.0.0; 3rd Generation Partnership Project; Technical Specification Group Services and System Aspects; System Architecture for the 5G system; Stage 2 (Release 15)

NPL 2: 3GPP TS 23.502 v0.4.0; 3rd Generation Partnership Project; Technical Specification Group Services and System Aspects; Procedures for the 5G system; Stage 2 (Release 15)

NPL 3: 3GPP TS 24.301 v14.3.0; 3rd Generation Partnership Project; Technical Specification Group Core Network and Terminals; Non-Access-Stratum (NAS) protocol for Evolved Packet System (EPS); Stage 3 (Release 14)

NPL 4: 3GPP TS 23.401 v14.4.0; 3rd Generation Partnership Project; Technical Specification Group Services and System Aspects, General Packet Radio Service (GPRS) enhancements for Evolved Universal Terrestrial Radio Access Network (E-UTRAN) access (Release 14)

NPL 5: 3GPP TS 24.229 v14.3.1; 3rd Generation Partnership Project; Technical Specification Group Core Network and Terminals; IP multimedia call control protocol based on Session Initiation Protocol (SIP) and Session Description Protocol (SDP); Stage 3 (Release 14)

NPL 6: 3GPP TS 23.228 v14.4.0; 3rd Generation Partnership Project; Technical Specification Group Services and System Aspects; IP Multimedia Subsystem (IMS); Stage 2 (Release 14)

SUMMARY OF INVENTION

Technical Problem

With respect to the 5GS, a known IMS being applied to the 5GS to support mobile communication voice call services has been studied.

More specifically, technical specifications have been studied to provide a mobile communication emergency call service suitable for a terminal and a network apparatus by exchanging various kinds of capability in an emergency call service between a terminal and a core network apparatus and exchanging various kinds of capability in an emergency call service between a terminal and an IMS apparatus.

However, there is no measure and the like for realizing connection to a network that is most suitable for the emergency call service by exchanging various kinds of capability in an emergency call service between core network apparatuses and exchanging various kinds of capability in an emergency call service between a terminal and an IMS apparatus as described above.

An object of the present invention is to provide a measure and the like for realizing connection to the network that is most suitable for the emergency call service by exchanging various kinds of capability in the emergency call service between the core network apparatuses and exchanging various kinds of capability in the emergency call service between the terminal and the IMS apparatus.

Solution to Problem

A user equipment according to an aspect of the present invention has a transmission and/or reception unit configured to transmit to a Proxy Call Session Control Function (Proxy-CSCF or P-CSCF) an IMS emergency call connection signal of a call which the user equipment cannot recognize as an emergency call in a case that a first core network to which the user equipment is to be connected supports only a voice service function and does not support an emergency call-dedicated Packet Data Unit (PDU) session function; and a controller configured to determine whether to transmit the IMS emergency call connection signal again to the P-CSCF via the first core network or whether to transmit the IMS emergency call connection signal again to the P-CSCF via a second core network in the same Public Land Mobile Network (PLMN) in a case that information indicating rejection or redirection indicating an emergency call connection is received from the P-CSCF.

A user equipment according to an aspect of the present invention has a transmission and/or reception unit configured to, in a registration procedure of the user equipment, transmit a registration request message including first identification information to an Access and Mobility Management Function (AMF), the first identification information being information indicating a preference (Prf) for prioritizing support of a voice service function and/or a bearer or a PDU session function for an emergency call by a first core network with which the user equipment attempts to register, and receive a registration complete message including 12th identification information from the AMF, the 12th identification information being identification information indicating whether a second core network in the same PLMN provides the voice service function and the bearer or the PDU session function for the emergency call.

In addition, a user equipment according to an aspect of the present invention has a transmission and/or reception unit configured to receive, in an IMS emergency call connection procedure of a call which the user equipment cannot recognize as an emergency call, a reject or redirection message including 23rd identification information from a Proxy Call Session Control Function (Proxy-CSCF or P-CSCF), the 23rd identification information being identification information indicating a second core network in the same PLMN supporting a voice service function and a bearer or a PDU session function for an emergency call, and prompting the user equipment to make an emergency call connection via the core network.

An Access and Mobility Management Function (AMF) according to an aspect of the present invention has a transmission and/or reception unit configured to, in a registration procedure for a user equipment, receive a registration request message including first identification information from the user equipment, the first identification information being information indicating a preference (Prf) for prioritizing support of a voice service function and/or a bearer or a PDU session function for an emergency call by a first core network with which the user equipment attempts to register, and transmit a registration complete message including 12th identification information to the user equipment, the 12th identification information being identification information indicating whether a second core network in the same PLMN provides the voice service function and the bearer or the PDU session function for the emergency call.

A core network apparatus according to an aspect of the present invention has a transmission and/or reception unit configured to, in a registration procedure for a user equipment, receive a registration request message including first identification information from the user equipment, the first identification information being information indicating a preference (Prf) for prioritizing support of a voice service function and/or a bearer or a PDU session function for an emergency call by a first core network with which the user equipment attempts to register, and transmit a registration complete message including 12th identification information to the user equipment, the $12^{th}$ identification information being identification information indicating whether a second core network in the same PLMN provides the voice service function and the bearer or the PDU session function for the emergency call.

A Proxy Call Session Control Function (Proxy-CSCF or P-CSCF) according to an aspect of the present invention has a transmission and/or reception unit configured to transmit, in an IMS emergency call connection procedure of a call which a user equipment cannot recognize as an emergency call, a reject or redirection message including 23rd identification information to the user equipment, the $23^{rd}$ identification information being identification information indicating a second core network in the same PLMN supporting a voice service function, and a bearer or a PDU session function for an emergency call, and prompting the user equipment to make an emergency call connection via the core network.

A communication control method for a user equipment according to an aspect of the present invention includes the steps of: in a registration procedure of the user equipment, transmitting a registration request message including first identification information to an Access and Mobility Management Function (AMF), the first identification information being information indicating a preference (Prf) for prioritizing support of a voice service function and/or a bearer or a PDU session function for an emergency call by a first core network with which the user equipment attempts to register, and receiving a registration complete message including 12th identification information from the AMF, the 12th identification information being identification information indicating whether a second core network in the same PLMN provides the voice service function and the bearer or the PDU session function for the emergency call.

A communication control method for a user equipment according to an aspect of the present invention includes the step of: receiving, in an IMS emergency call connection procedure of a call which the user equipment cannot recognize as an emergency call, a reject or redirection message including 23rd identification information from a Proxy Call Session Control Function (Proxy-CSCF or P-CSCF), the 23rd identification information being identification information indicating a second core network in the same PLMN supporting a voice service function and a bearer or a PDU session function for an emergency call, and prompting the user equipment to make an emergency call connection via the core network.

A communication control method for an Access and Mobility Management Function (AMF) according to an aspect of the present invention includes the steps of: in a registration procedure for a user equipment, receiving a registration request message including first identification information from the user equipment, the first identification information being information indicating a preference (Prf) for prioritizing support of a voice service function and/or a bearer or a PDU session function for an emergency call by a first core network with which the user equipment attempts to register, and transmitting a registration complete message including 12th identification information to the user equipment, the 12th identification information being identification information indicating whether a second core network in the same PLMN provides the voice service function and the bearer or the PDU session function for the emergency call.

A communication control method for a core network apparatus according to an aspect of the present invention includes the steps of: in a registration procedure for a user equipment, receiving a registration request message including first identification information from the user equipment, the first identification information being information indicating a preference (Prf) for prioritizing support of a voice service function and/or a bearer or a PDU session function for an emergency call by a first core network with which the user equipment attempts to register, and transmitting a registration complete message including 12th identification information to the user equipment, the 12th identification information being identification information indicating whether a second core network in the same PLMN provides the voice service function and the bearer or the PDU session function for the emergency call.

A communication control method for a Proxy Call Session Control Function (Proxy-CSCF or P-CSCF) according to an aspect of the present invention includes the step of: transmitting, in an IMS emergency call connection procedure of a call which a user equipment cannot recognize as an emergency call, a reject or redirection message including 23rd identification information to the user equipment, the 23rd identification information being identification information indicating a second core network in the same PLMN supporting a voice service function and a bearer or a PDU session function for an emergency call, and prompting the user equipment to make an emergency call connection via the core network.

Advantageous Effects of Invention

According to the present invention, a terminal can be connected to a most suitable network for an emergency call service. Furthermore, a 5GS and an IMS can perform a network-initiated control of behaviors of a terminal such that the terminal is connected to a network that is most suitable for emergency call, and provide a safer and more secured mobile communication service.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. Embodiment 1.1. System Overview

Figure 1:
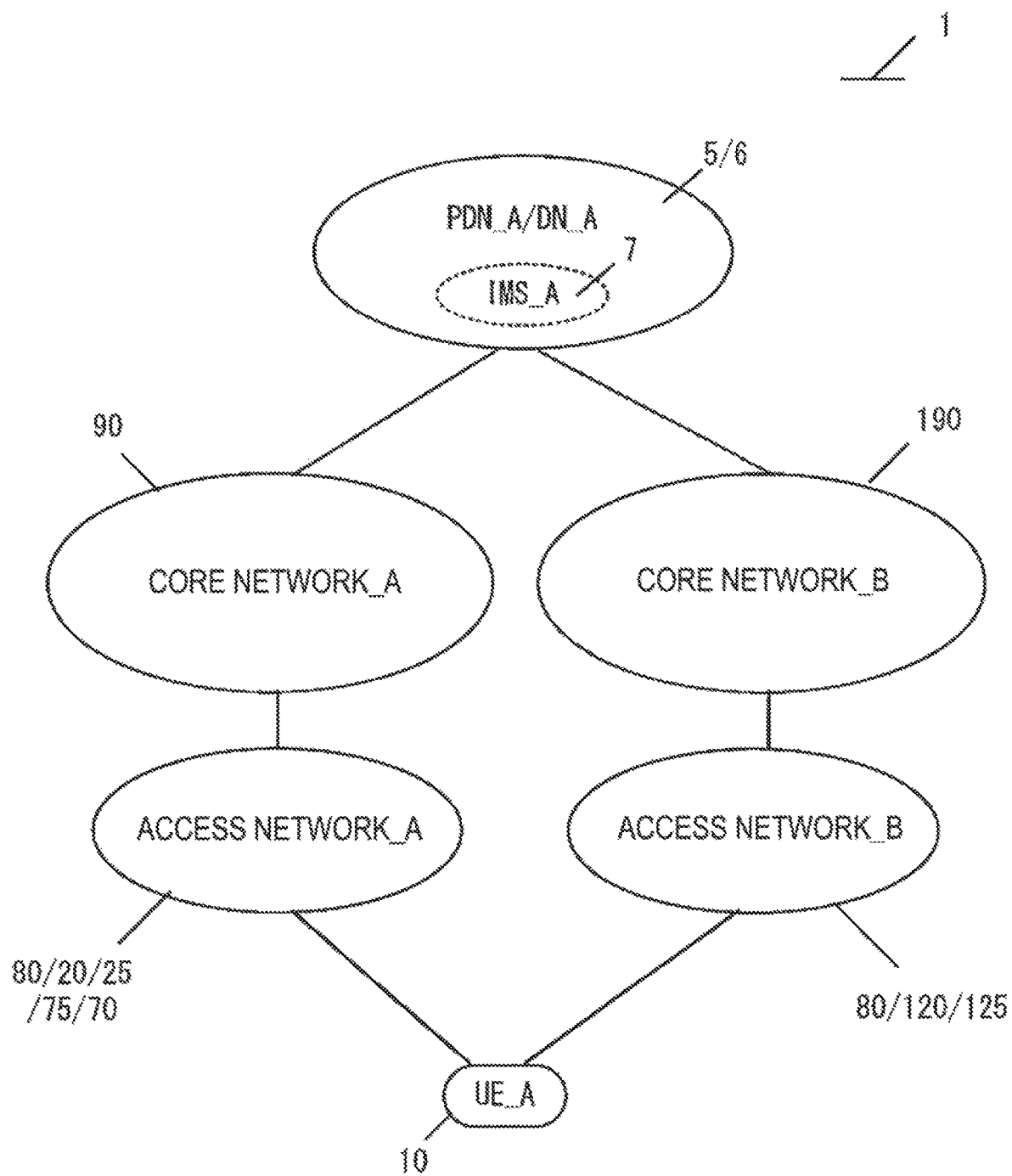
FIG. 1 is a diagram illustrating an overview of a mobile communication system.
Figure 2:
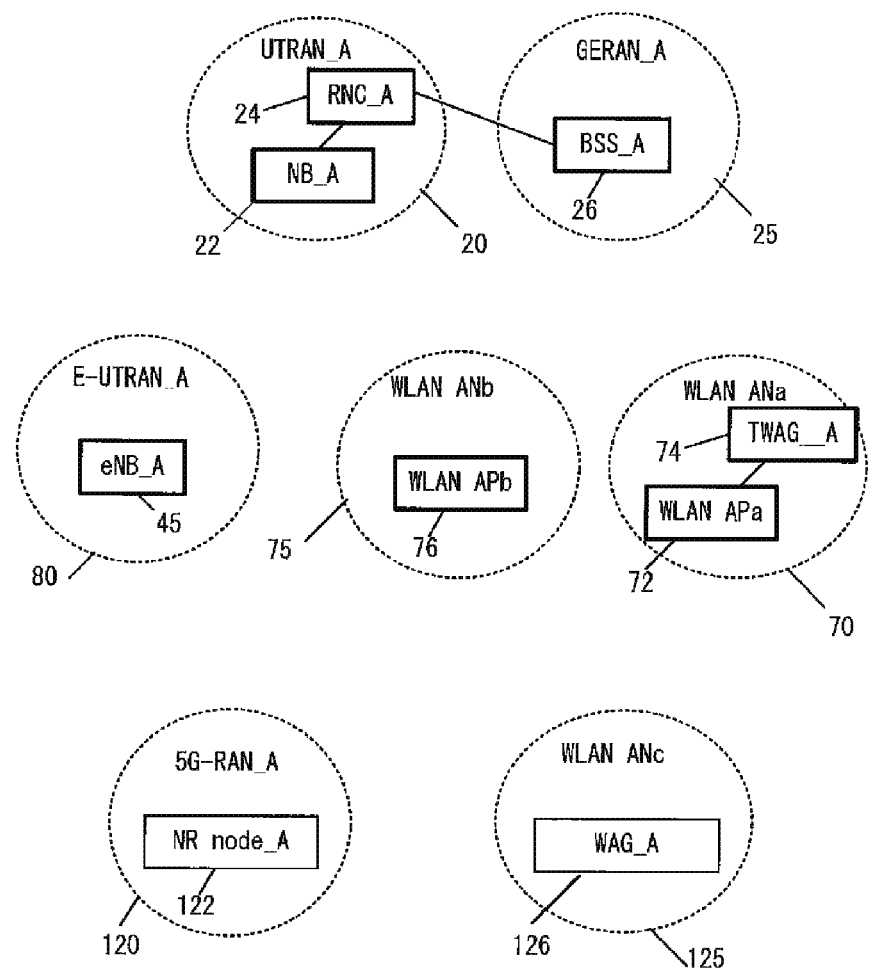
FIG. 2 is a diagram illustrating an example of a configuration and the like of access networks in the mobile communication system.
Figure 3:
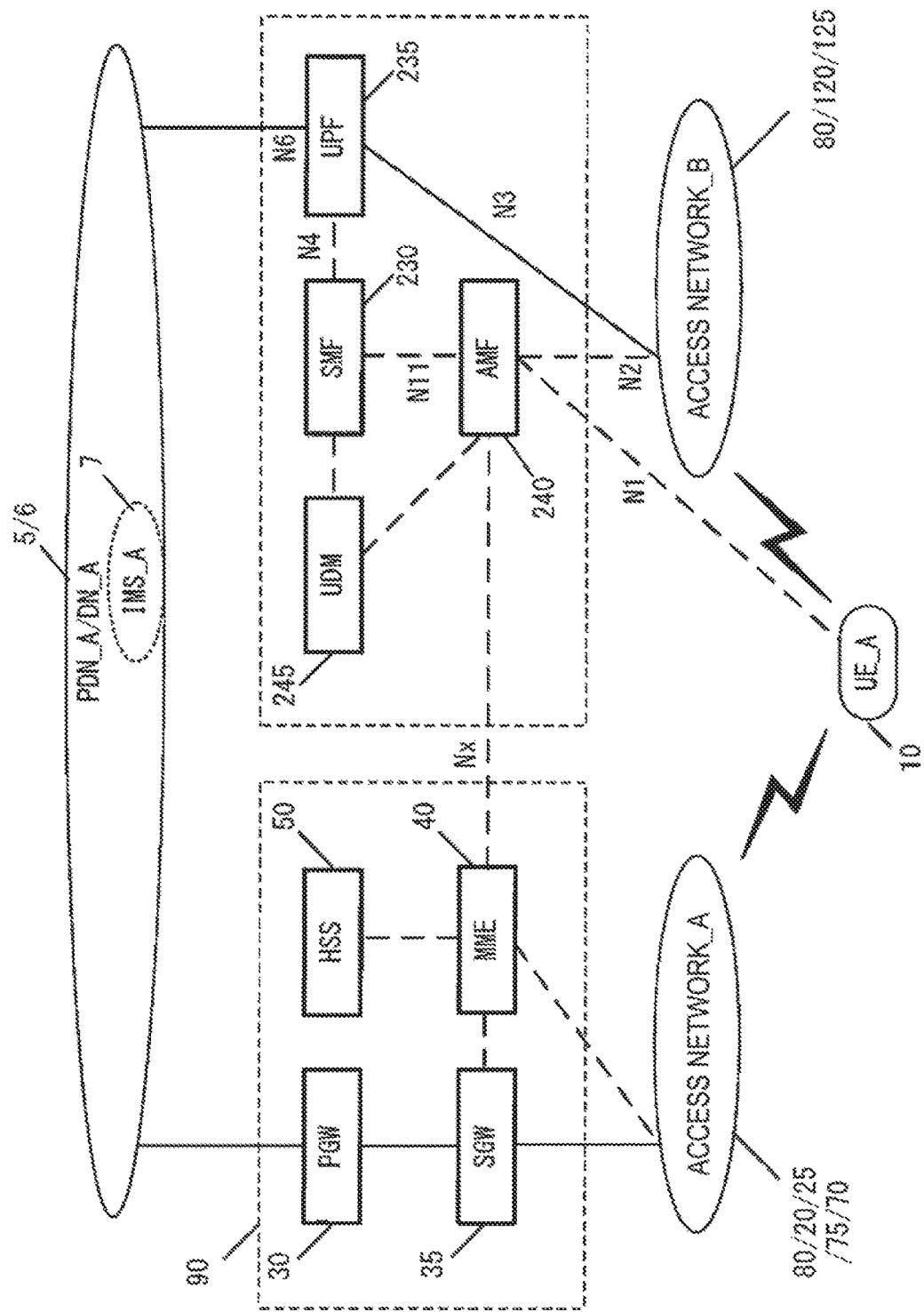
FIG. 3 is a diagram illustrating an example of a configuration and the like of a core network and access networks in the mobile communication system.
Figure 4:
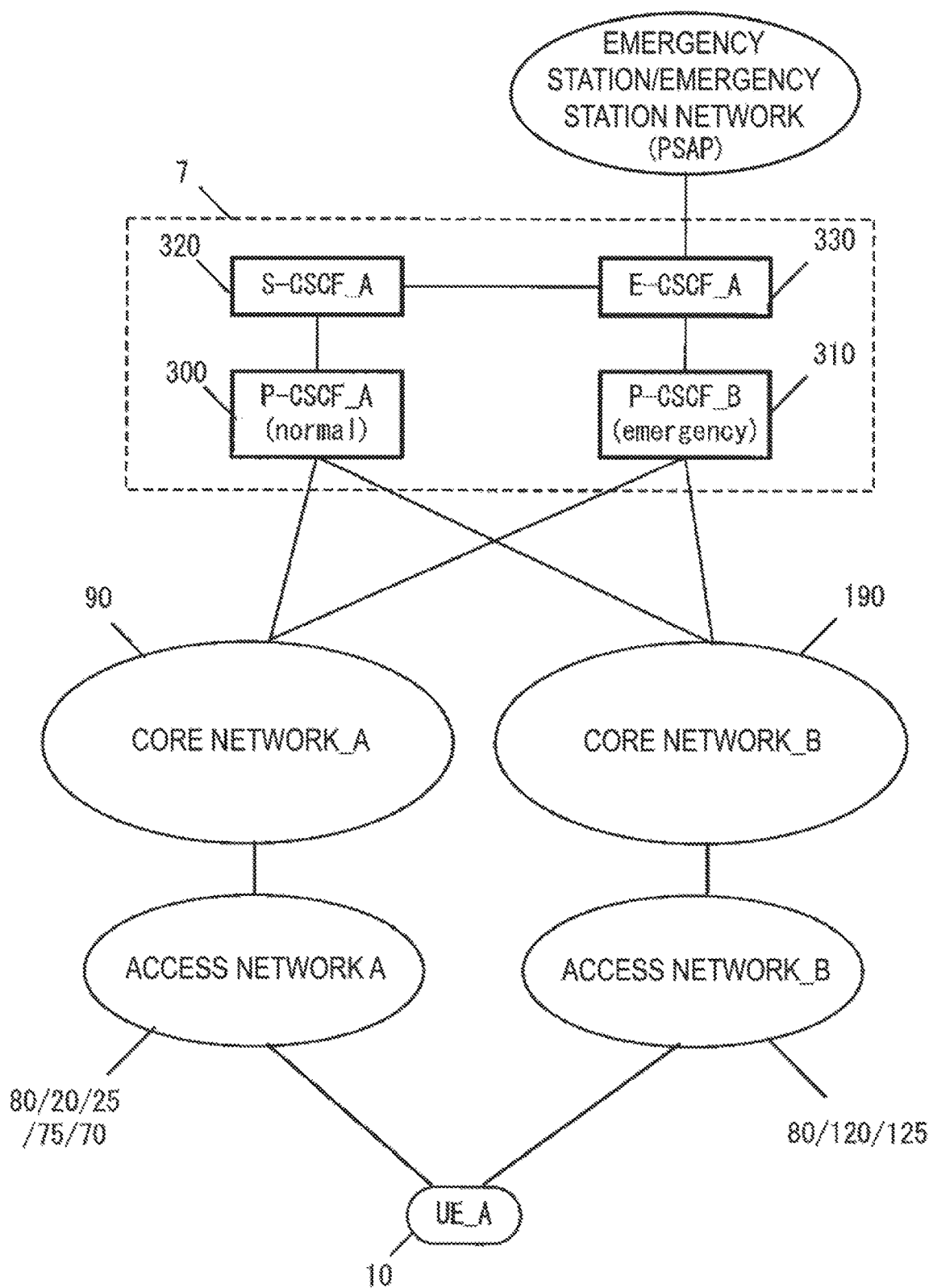
FIG. 4 is a diagram illustrating schematic connection of a normal voice call, an emergency station for an emergency call connection service, an IMS, and core networks.

An overview of a mobile communication system according to the present embodiment will be described with reference to FIGS. 1, 2, 3, and 4. FIG. 2 is a diagram for detailing access networks of the mobile communication system of FIG. 1. FIG. 3 is a diagram illustrating an example of a configuration of access networks and a core network in the mobile communication system of FIG. 1. FIG. 4 is a diagram mainly illustrating an example of a connection configuration of an IP Multimedia Subsystem (IMS) and core networks in the mobile communication system of FIG. 1. As illustrated in FIG. 1, the mobile communication system 1 according to the present embodiment includes a user equipment (which is also referred to as a terminal apparatus or a mobile terminal apparatus), User Equipment (UE)_A 10, an Access Network (AN)_A, an access network_B, and a Core Network (CN)_B 190, a core network_A 90, a Data Network (DN)_A 5, a Packet Data Network (PDN)_B 6, and an IMS_A 7. Note that, for the sake of simplicity, the core network_A, the core network_B, or a combination thereof may also be referred to as a core network, and the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an embedded UICC (eUICC). Furthermore, the UE_A 10 may be a wirelessly connectable terminal apparatus and may be Mobile Equipment (ME), a Mobile Station (MS), a cellular Internet of Things (CIoT) terminal (CIoT UE), or the like.

In addition, the UE_A 10 can be connected to an access network and/or core network. In addition, the UE_A 10 can be connected to the DN_A 5 and/or the PDN_A 6 via the access network and/or the core network. The UE_A 10 transmits and/or receives (communicates) the user data to and/or from the DN_A 5 and/or the PDN_A 6 by using a Protocol Data Unit or Packet Data Unit (PDU) session and/or a Packet Data Network (PDN) connection (PDN connection). Furthermore, the communication of the user data is not limited to Internet Protocol (IP) communication, and may be non-IP communication.

Here, IP communication is data communication using IP, and is data communication achieved by transmitting and/or receiving an IP packet including an IP header. Note that a payload section constituting the IP packet may include the user data transmitted and/or received by the UE_A 10. Furthermore, non-IP communication is data communication without using IP, and is data communication achieved by transmitting and/or receiving data without IP header. For example, non-IP communication may be the data communication achieved by transmitting and/or receiving application data without IP header, or may transmit and/or receive the user data, transmitted and/or received by the UE_A 10, that includes another header such as Media Access Control (MAC) header or Ethernet (registered trademark) frame header.

In addition, a PDU session or a PDN connection is connectivity established between the UE_A 10 and the DN_A 5 and/or the PDN_A 6 to provide a PDU connection service. To be more specific, the PDU session or the PDN connection may be connectivity established between the UE_A 10 and an external gateway. Here, the external gateway may be a User Plane Function (UPF), a Packet Data Network Gateway (PGW), a Service Capability Exposure Function (SCEF), or the like. Furthermore, the PDU session or the PDN connection may be a communication path established to transmit and/or receive the user data between the UE_A 10 and the core network and/or the DN, or a communication path established to transmit and/or receive the PDU. Furthermore, the PDU session or the PDN connection may be a session established between the UE_A 10 and the core network and/or the DN, or may be a logical communication path including a transfer path such as one or more flows or bearers and the like between apparatuses in the mobile communication system 1. To be more specific, the PDU session or the PDN connection may be a connection established between the UE_A 10 and the core network and/or the external gateway, or a connection established between the UE_A 10 and a UPF_A 235 or a PGW_A 30. Note that the PDN connection may be connection and/or a connection between the UE_A 10 and the PGW_A 30 via an evolved NodeB (eNB)_A 45 and/or a Serving Gateway (SGW)_A 35, or connectivity and/or a connection between the UE_A 10 and an SCEF via the eNB_A 45 and/or a Mobility Management Entity (MME)_A 40. Furthermore, the PDU session may be connectivity and/or a connection between the UE_A 10 and the UPF_A 235 via an NR node_A 122. Furthermore, the PDN connection may be identified by a PDN connection ID, and the PDU session may be identified by a PDU session ID. Furthermore, the PDN connection and the PDU session may be identified by an EPS bearer ID. Note that, for simplicity, the PDU session and/or the PDN connection may be referred to as a PDU session.

Note that the UE_A 10 can transmit and/or receive the user data to and/or from an apparatus, such as an application server, that is located in the DN_A 5 and/or the PDN_A 6 by using the PDU session or the PDN connection. In other words, the PDU session or the PDN connection can transfer the user data transmitted and/or received between the UE_A 10 and the apparatus, such as an application server, that is located in the DN_A 5 and/or the PDN_A 6. Furthermore, each apparatus (the UE_A 10, an apparatus in the access network, and/or an apparatus in the core network) may associate one or more pieces of identification information with the PDU session or the PDN connection for management. Note that these pieces of identification information may include at least one of an Access Point Name (APN), a Traffic Flow Template (TFT), a session type, application identification information, identification information of the DN_A 5 and/or the PDN_A 6, Network Slice Instance (NSI) identification information, Dedicated Core Network (DCN) identification information, and access network identification information, or may further include other information. Furthermore, in a case that multiple PDU sessions are established, respective pieces of identification information associated with the PDU sessions or the PDN connections may have the same content or different content. Furthermore, the NSI identification information is information for identifying an NSI, and hereinafter may be an NSI ID or a Slice Instance ID.

In addition, the access network_A and/or the access network_B may be any of an Evolved Universal Terrestrial Radio Access Network (E-UTRAN)_A 80, a Universal Terrestrial Radio Access Network (UTRAN)_A 20, a GSM (registered trademark) EDGE Radio Access Network (GERAN)_A 25, a WLAN ANb 75, a WLAN ANa 70, a 5G-RAN_A 120, and a WLAN ANc 125 as illustrated in FIG. 2. Note that the E-UTRAN_A 80 and/or the 5G-RAN_A 120 and/or the UTRAN_A 20 and/or the GERAN_A 25 may also be referred to as 3GPP access networks, and the WLAN ANb 75 and/or the WLAN Ana 70 and/or the WLAN ANc 125 may be referred to as non-3GPP access networks. Each radio access network includes an apparatus to which the UE_A 10 is actually connected (e.g., a base station apparatus or an access point), and the like.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). Furthermore, in a case that multiple eNBs are present in the E-UTRAN_A 80, the multiple eNBs may be connected to each other.

In addition, the UTRAN_A 20 is a 3G access network and configured to include a Radio Network Controller (RNC)_A 24 and a Node B (NB)_A 22. The NB_A 22 is a radio base station to which the UE_A 10 connects through Universal Terrestrial Radio Access (UTRA), and the UTRAN_A 20 may include one or multiple radio base stations. Furthermore, the RNC_A 24 is a controller for connecting the core network_A 90 and the NB_A 22, and the UTRAN_A 20 may be configured to include one or multiple RNCs. Moreover, the RNC_A 24 may be connected to one or multiple NBs_A 22. In addition, the RNC_A 24 may be connected to a radio base station (Base Station Subsystem (BSS)_A 26) included in the GERAN_A 25.

Furthermore, the GERAN_A 25 is a 2G access network, and configured to include the BSS_A 26. The BSS_A 26 is a radio base station to which the UE_A 10 connects through GSM (trade name)/EDGE Radio Access (GERA), and the GERAN_A 25 may be configured to include one or multiple BSSs_A 26. The multiple BSSs_A 26 may be connected to each other. The BSS_A 26 may be connected to the RNC_A 24.

Furthermore, the 5G-RAN_A 120 is a 5G access network, and configured to include one or more New Radio Access Technology nodes (NR nodes)_A 122. The NR node_A 122 is a radio base station to which the UE_A 10 connects with 5G radio access. Also, in a case that there are multiple NR nodes_A 122 in the 5G-RAN_A 120, each of the multiple NR nodes_A 122 may be connected to one another.

Note that the 5G-RAN_A 120 may be an access network configured in the E-UTRA and/or the 5G Radio Access. In other words, the 5G-RAN_A 120 may include the eNB_A 45, the NR node_A 122, or both the eNB_A 45 and the NR node_A 122. In this case, the eNB_A 45 and the N R node_A 122 may be similar apparatuses. Therefore, the NR node_A 122 can be substituted with the eNB_A 45.

In addition, the WLAN ANa 70 is a wireless LAN access network, and configured to include a Wireless Local Area Network Access Point (WLAN AP)a 72 and a Trusted WLAN Access Gateway (TWAG)_A 74. The WLAN APa 72 is a radio base station to which the UE_A 10 connects through the WLAN access system trusted by the operator operating the core network_A 90, and the WLAN ANa 70 may be configured to include one or multiple radio base stations. The TWAG_A 74 serves as a gateway between the core network_A 90 and the WLAN ANa 70. The WLAN APa 72 and the TWAG_A 74 may be configured as a single apparatus. Even in a case that the operator operating the core network_A 90 and the operator operating the WLAN ANa 70 are different, such a configuration can be implemented through contracts and agreements between the operators.

In addition, the WLAN ANb 75 is a radio LAN access network, and configured to include a WLAN APb 76. The WLAN APb 76 is a radio base station to which the UE_A 10 connects through the WLAN access system in a case that no trusting relationship is established with the operator operating the core network_A 90, and the WLAN ANb 75 may be configured to include one or multiple radio base stations.

In this manner, the WLAN ANb 75 is connected to the core network_A 90 by using, as a gateway, the enhanced Packet Data Gateway (ePDG) which is an apparatus included in the core network_A 90. The ePDG has a security function for ensuring security.

The WLAN ANc 125 is a wireless LAN access network and configured to include one or more WLAN Access Gateway (WAG)_A 126. The WAG_A 126 is a radio base station to which the UE_A 10 connects with wireless LAN access. Furthermore, the WAG_A 126 may serve as a gateway between the core network_B 190 and the WLAN ANc 125. As for the WAG_A 126, a function unit for the radio base station and a function unit for the gateway may be configured in different apparatuses. Note that the WLAN ANc 125 may have the same configuration as the WLAN ANa 70 and/or the WLAN ANb 75 or have a different configuration from them.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45 and/or the WAG_A 126."

Furthermore, the access network is a radio network connecting with the UE_A 10 and/or the core network. The access network may be a 3GPP access network, or a non-3GPP access network. Note that the 3GPP access network may be the UTRAN_A 20 and/or the GERAN_A 25 and/or the E-UTRAN_A 80 and/or the 5G-Radio Access Network (RAN)_A 120, and the non-3GPP access network may be the WLAN ANb 75 and/or the WLAN ANa 72 and/or the WLAN ANc 125. Note that the UE_A 10 may connect to the access network or to the core network via the access network in order to connect to the core network.

In addition, the DN_A 5 and/or the PDN_A 6 is a data network or a packet data network that provides communication services to the UE_A 10, may be configured as a packet data service network, and may be configured for each service. For example, there may be the DN_A 5 and/or the PDN_A 6 that provides IMS services, and the DN_A 5 and/or the PDN_A 6 may include an apparatus that provides IMS services. In other words, the DN_A 5 and/or the PDN_A 6 may be configured as an IMS_A 7, the DN_A 5 and/or the PDN_A 6 may include the IMS_A 7, and the IMS_A 7 may provide the UE_A 10 with a normal call connection service and/or an emergency call connection service for voice services. Furthermore, the DN_A 5 and/or the PDN_A 6 may include a connected communication terminal. Therefore, connecting to the DN_A 5 and/or the PDN_A 6 may be connecting to a communication terminal or a server apparatus deployed in the DN_A 5 and/or the PDN_A 6. Furthermore, the transmission and/or reception of the user data to and/or from the DN_A 5 and/or the PDN_A 6 may be transmission and/or reception of the user data to and/or from the communication terminal or the server apparatus deployed in the DN_A 5 and/or the PDN_A 6. In addition, although the DN_A 5 and/or the PDN_A 6 is outside the core networks in FIG. 1, they may be within the core networks.

Furthermore, the core network_A 90 and/or the core network_B 190 may be configured as one or more core network apparatuses. Here, the core network apparatuses may be apparatuses that perform part or all of processing or functions of apparatuses included in the core network_A 90 and/or the core network_B 190.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Conversely, the EPC may be the core network_A 90, and the 5GC may be the core network_B 190. Furthermore, the core network_B 190 may be a core network for a system providing the 5G communication service. Note that the core network_A 90 and/or the core network_B 190 is not limited to the above, and may be a network for providing a mobile communication service.

Next, the core networks will be described. In the present embodiment, configuration examples of the core network_A 90 and core network_B 190 will be described. Note that the core networks may be the core network_A 90, the core network_B 190, or a combination thereof.

The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. In addition, the core network_A 90 is capable of connecting to multiple radio access networks (the UTRAN_A 20, the GERAN_A 25, the E-UTRAN_A 80, the WLAN ANb 75, and the WLAN ANa 70).

Although only the HSS (HSS_A 50), the PGW (PGW_A 30), the SGW (SGW_A 35), and the MME (MME_A 40) among the network elements are described in FIG. 3 for simplicity, it does not mean that no other apparatuses and/or NFs are included therein. Note that the UE_A 10 will also be referred to as UE, the HSS_A 50 as an HSS, the PGW_A 30 as a PGW, the SGW_A 35 as a SGW, the MME_A 40 as an MME, and the DN_A 5 and/or the PDN_A 6 as a DN for simplicity.

Furthermore, solid lines or dotted lines indicate interfaces between apparatuses in FIG. 3. Here, the solid lines indicate interfaces for U-Plane, and the dotted lines indicate interfaces for C-Plane.

First, a brief description of each apparatus included in the core network_A 90 will be provided.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Further, the PGW_A 30 may be connected to a User Plane Function (UPF) and a Session Management Function (SMF) or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN_A 25, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management device to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50.

Furthermore, in a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as mobility management (MM) and session management (SM), or capability information. The NF may be a function device to realize a single function, or a function device to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management device different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

In addition, the PCRF may be a PCF to create and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN_A 25, and the SGW_A 35, for performing location management between a 3G/2G access network (UTRAN/GERAN) and the LTE access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_5 and/or PDN_A 6 and/or DN may be also deployed. Note that the SCEF may be outside or inside the core network.

Next, the core network_B 190 may include at least one of an Authentication Server Function (AUSF), an Access and Mobility Management Function (AMF)_A 240, a Structured Data Storage Network Function (SDSF), an Unstructured data Storage Network Function (UDSF), a Network Exposure Function (NEF), an NF Repository Function (NRF), a Policy Control Function (PCF), a Session Management Function (SMF)_A 230, a Session Management Function (SMF)_B 232, a Unified Data Management (UDM)_A 245, a User Plane Function (UPF)_A 235, a User Plane Function (UPF)_B 237, an Application Function (AF), and a Non-3GPP Interworking Function (N3IWF). Furthermore, these may also be configured as Network Functions (NFs). The NF may be a processing function included in a network. In addition, the core network_B 190 is capable of connecting to multiple radio access networks (the E-UTRAN_A 80, the 5G-RAN_A 120, and the WLAN ANc 125). Such radio access networks may be configured such that multiple different access networks are connected, or any one of the multiple different access networks is connected.

Although only the AMF_A 240, the SMF_A 230, and the UPF_A 235 are illustrated in FIG. 3 among the above elements for simplicity, it does not mean that no other elements (apparatuses and/or NFs) are included therein. Note that the UE_A 10 will also be referred to as UE, the AMF_A 240 as an AMF, the SMF_A 230 as an SMF, the UPF_A 235 as a UPF, and the DN_A 5 and/or the PDN_A 6 as a DN for simplicity.

In addition, FIG. 3 shows an N1 interface (hereinafter, also referred to as a reference point), an N2 interface, an N3 interface, an N4 interface, an N6 interface, an N11 interface, and an Nx interface. Here, the N1 interface is an interface between the UE and the AMF, the N2 interface is an interface between the (R) AN (access network) and the AMF, and the N3 interface is an interface between the (R) AN (access network) and the UPF, the N4 interface is an interface between the SMF and the UPF, the N6 interface is an interface between the UPF and the DN, the N11 interface is an interface between the AMF and the SMF, and the Nx interface is an interface between the AMF of the core network_B 190 and the MME of the core network_A 90. These interfaces can be used to perform communication between the apparatuses. Furthermore, the interfaces linking the apparatuses are indicated by solid lines and dotted lines in FIG. 3. Here, the solid lines indicate interfaces for U-Plane, and the dotted lines indicate interfaces for C-Plane.

Next, a brief description of each apparatus included in the core network_B 190 is given.

First, the AMF_A 240 is connected to another AMF, the SMF_A 230, access networks (i.e., the E-UTRAN_A 80, the 5G-RAN_A 120, the WLAN ANc 125, the WLAN ANa 70, and the WLAN ANb 75), the UDM_A 245, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. In addition, one or more AMF_A 240s may be deployed within the core network_B 190. In addition, the AMF_A 240 may be an NF that manages one or more Network Slice Instances (NSI). In addition, the AMF_A 240 may also be a Common Control Plane Network Function (Common CPNF, or CCNF) shared among multiple NSIs.

In addition, the RM state is, for example, a non-registered state (RM-DEREGISTERED state) or a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

In addition, the CM state is, for example, a disconnected state (CM-IDLE state) or a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

In addition, the SMF_A 230 is connected to the AMF_A 240, the UPF_A 235, the UDM_A 245, and the PCF. The SMF_A 230 may play roles of session management of PDU session, or the like, IP address allocation for the UE, UPF selection and control, UPF configuration for routing traffic to an appropriate destination, a function of reporting arrival of downlink data (Downlink Data Notification), determination of a Session and Service Continuity mode (SSC mode) for a session and an identifier of SM information unique to the AN (for each AN) to be transmitted to the AN via the AMF and the N2 interface, a roaming function, and the like.

In addition, the UPF_A 235 is connected to the DN_A 5, the SMF_A 230, another UPF, and the access networks (i.e. the E-UTRAN_A 80, the 5G-RAN_A 120, the WLAN ANc 125, the WLAN ANa 70, and the WLAN ANb 75). The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

In addition, the AUSF is connected to the UDM_A 245 and the AMF_A 240. The AUSF functions as an authentication server.

The SDSF provides a function for the NEF to store or retrieve information as structured data.

The UDSF provides a function for all NFs to store or retrieve information as unstructured data.

The NEF provides a means to securely provide services and capabilities provided by the 3GPP network. The NEF stores information received from another NF as structured data.

In a case that a N F discovery request is received from a NF instance, the NRF provides the NF with information of found NF instances or holds information of available NF instances or services supported by the instances.

The PCF is connected to the SMF_A 230, the AF, and the AMF_A 240. The PCF provides a policy rule and the like.

The UDM_A 245 is connected to the AMF_A 240, the SMF_A 230, the AUSF, and the PCF. The UDM_A 245 includes a UDM FE (application front end) and a User Data Repository (UDR). The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

Next, the IMS_A 7 may include at least one of a Proxy Call Session Control Function (Proxy-CSCF or P-CSCF)_A 300, a P-CSCF_B 310, an Interrogating Call Session Control Function (Interrogating-CSCF or I-CSCF), a Serving Call Session Control Function (Serving-CSCF or S-CSCF)_A 320, and an Emergency Call Session Control Function (Emergency-CSCF or E-CSCF)_A 330. These may be configured as network functions (NFs). The NF may be a processing function included in a network. Here, the Call Session Control Function (CSCF) is a collective name of apparatuses and/or NFs, such as a P-CSCF and/or an S-CSCF and/or an E-CSCF and/or an I-CSCF, that play roles of a server and/or a proxy to process signaling packets of Session Initiation Protocol (SIP) in an IP Multimedia Subsystem (IMS).

Although only the P-CSCF_A 300, the P-CSCF_B 310, the S-CSCF_A 320, and E-CSCF_A 330 are described in FIG. 4 for simplicity, it does not mean that no other elements (apparatuses and/or NFs) are included therein. Note that the P-CSCF_A 300 and/or the P-CSCF_B 310 are referred to as a P-CSCF, the S-CSCF_A 320 as a S-CSCF, and the E-CSCF_A 330 as an E-CSCF for simplicity.

In addition, the emergency station/emergency station network (Public Safety Answering Point or PSAP) described in FIG. 4 may be a connection destination and/or a connection destination network of an emergency call connection requested by the UE_A 10.

Next, a brief description of each apparatus included in the IMS_A 7 will be given.

First, the P-CSCF is connected to the core network_A and or the core network_B and/or the UPF and/or the PWG and/or the S-CSCF and/or the E-CSCF, and/or the like. The P-CSCF is an SIP proxy server in a case that the UE_A 10 connects to the IMS_A 7. The P-CSCF is an apparatus of the IMS_A 7 to which the UE_A 10 first connects, and allocated to the UE_A 10 in the registration procedure described below. The UE_A 10 may acquire the destination address of the P-CSCF during the procedure. Furthermore, the P-CSCF may perform processing of the normal call connection and processing of the emergency call connection required by the UE_A 10 with different apparatuses and/or NFs or the same apparatus and/or NF.

In addition, the S-CSCF is also connected to the HSS_A 50 and or the UDM_A 245 and or the P-CSCF and/or the I-CSCF and/or the E-CSCF, and/or the like. The S-CSCF is an SIP server that performs session control and/or user authentication of the IMS for the UE_A 10.

The E-CSCF is connected to the P-CSCF and/or the S-CSCF and/or the I-CSCF and/or the emergency station/emergency station network (PSAP), and/or the like. The E-CSCF is a CSCF for processing an emergency call and may control, for example, routing of an emergency call request to an appropriate emergency station/emergency station network (PSAP).

1.2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 5:
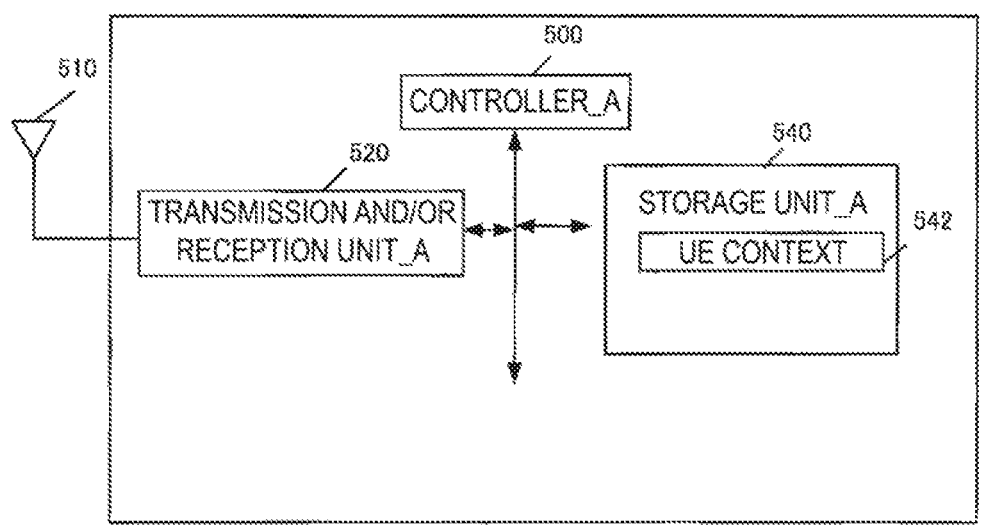
FIG. 5 is a diagram illustrating an apparatus configuration of UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Furthermore, an external antenna 510 is connected to the transmission and/or reception unit_A 520. Furthermore, the storage unit_A 540 stores a UE context 442.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station (the E-UTRAN_A 80 and the 5G-RAN_A 120) and/or the access point (the WLAN ANc 125) in the access network to connect to the access network. In other words, the UE_A 10 can connect to the base station and/or the access point in the access network via the external antenna 510 connected to the transmission and/or reception unit_A 520. To be specific, the UE_A 10 can transmit and/or receive user data and/or control information to and/or from the base station and/or the access point in the access network via the external antenna 510 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, and the like included in a control message which is transmitted and/or received in the communication procedure described below. Examples of the UE context stored in the storage unit_A 540 may include a UE context used to connect to the access networks_B 80/120/125 and a UE context used to connect to the core network_B 190. In addition, examples of the UE context 442 may include a UE context stored for each UE, a UE context stored for each PDU session, and a UE context stored for each bearer. The UE context stored for each UE may include an IMSI, an EMM State, a GUTI, and an ME Identity. Furthermore, the UE context stored for each PDU session may include an APN in Use, an assigned session type, IP address(es), and a default bearer. Furthermore, the UE context stored for each bearer may include an EPS bearer ID, a TI, and a TFT.

1.2.2. Configuration of eNB/NR Node/WAG

Figure 6:
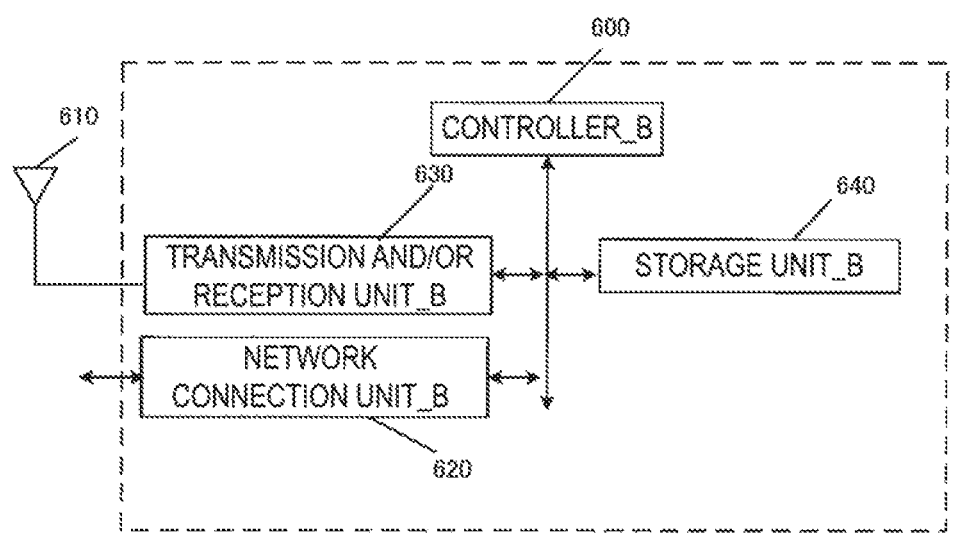
FIG. 6 is a diagram illustrating an apparatus configuration of an eNB/NR node/WAG.

Next, FIG. 6 illustrates an example of an apparatus configuration of the eNB_A 45, the NR node_A 122, and the WAG_A 126. As illustrated in FIG. 6, the eNB_A 45, the NR node_A 122, and the WAG_A 126 include a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Furthermore, an external antenna 610 is connected to the transmission and/or reception unit_B 630.

The controller_B 600 is a function unit for controlling all of the eNB_A 45, the NR node_A 122, and the WAG_A 126, and implements various processes of the eNB_A 45, the NR node_A 122, and the WAG_A 126 by reading out and performing various types of information and programs stored in the storage unit_B 640.

The network connection unit_B 620 is a function unit through which the eNB_A 45, the NR node_A 122, and the WAG_A 126 connect to the AMF_A 240 and the UPF_A 235 in the core network. In other words, the eNB_A 45, NR node_A 122, and the WAG_A 126 can be connected to the AMF_A 240 and the UPF_A 235 in the core network via the network connection unit_B 620. Specifically, the eNB_A 45, NR node_A 122, and the WAG_A 126 can transmit and/or receive user data and/or control information to and/or from AMF_A 240 and/or the UPF_A 235 via the network connection unit_B 620.

The transmission and/or reception unit_B 630 is a function unit through which the eNB_A 45, the NR node_A 122, and the WAG_A 126 connect to the UE_A 10. In other words, eNB_A 45, the NR node_A 122, and the WAG_A 126 can transmit and/or receive user data and/or control information to and/or from the UE_A 10 via the transmission and/or reception unit_B 630.

The storage unit_B 640 is a function unit for storing programs, data, and the like necessary for each operation of the eNB_A 45, the NR node_A 122, and the WAG_A 126. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

1.2.3. Configuration of MME/AMF

Figure 7:
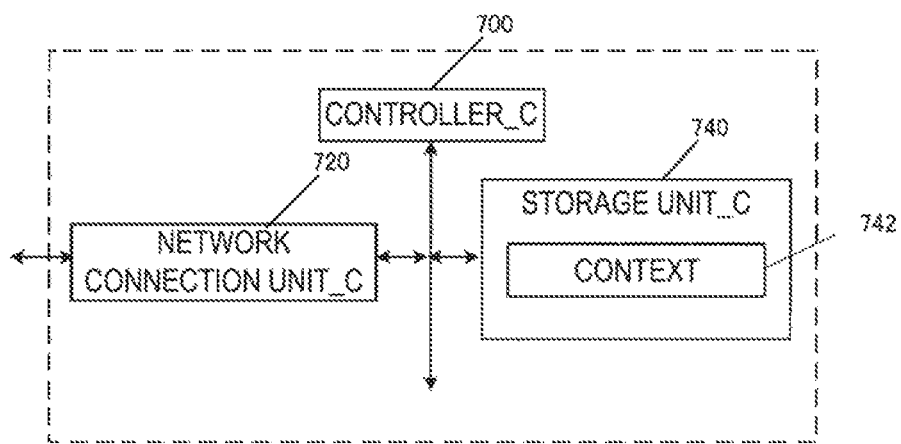
FIG. 7 is a diagram illustrating an apparatus configuration of an MME/AMF.

Next, FIG. 7 illustrates an example of an apparatus configuration of the MME_A 40 and/or the AMF_A 240. As illustrated in FIG. 7, the MME_A 40 and/or the AMF_A 240 include a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 742.

The controller_C 700 is a function unit for controlling all of the MME_A 40 and/or the AMF_A 240, and implements various processes of all of the MME_A 40 and/or the AMF_A 240 by reading out and performing various types of information and programs stored in the storage unit_C 740.

The network connection unit_C 720 is a function unit through which the MME_A 40 and/or the AMF_A 240 connect to another AMF_240, SMF_A 230, a base station (the E-UTRAN_A 80 and the 5G-RAN_A 120) and/or an access point (the WLAN ANc 125), the UDM_A 245, the AUSF, and the PCF in the access network. In other words, the MME_A 40 and/or the AMF_A 240 can transmit and/or receive user data and/or control information to and/or from the base station and/or access point, the UDM_A 245, the AUSF, and the PCF in the access network via the network connection unit_C 720.

The storage unit_C 740 is a function unit for storing programs, data, and the like necessary for each operation of the MME_A 40 and/or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 742 stored in the storage unit_C 740 may include a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. Furthermore, the context stored for each PDU session may include an APN in Use, an assigned session type, IP address(es), a PGW F-TEID, an SCEF ID, and a default bearer. Furthermore, the context stored for each bearer may include an EPS bearer ID, a TI, a TFT, an SGW F-TEID, a PGW F-TEID, an MME F-TEID, an eNB address, an NR node address, a WAG address, an eNB ID, an NR node ID, and a WAG ID.

1.2.4. Configuration of SMF

Figure 8:
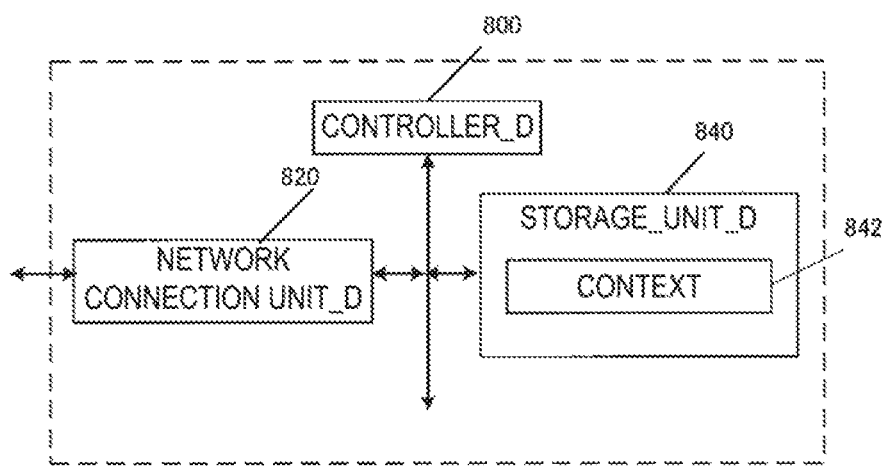
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 842.

The controller_D 800 of the SMF_A 230 is a function unit for controlling the entire SMF_A 230 and implements various processes of the entire SMF_A 230 by reading out and performing various types of information and programs stored in the storage unit_D 840.

Furthermore, the network connection unit_D 820 of the SMF_A 230 is a function unit through which the SMF_A 230 connects to the AMF_A 240, the UPF_A 235, the UDM_A 245, and the PCF. In other words, the SMF_A 230 can transmit and/or receive user data and/or control information to and/or from the AMF_A 240, the UPF_A 235, the UDM_A 245, and the PCF via the network connection unit_D 820.

Furthermore, the storage unit_D 840 of the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 842 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an assigned session type, IP address (es), an SGW F-TEID, a PGWF-TEID, and a default bearer. The context stored for each bearer may include an EPS bearer ID, a TFT, an SGW F-TEID, and a PGW F-TEID.

1.2.5. Configuration of PGW/UPF

Next, FIG. 8 illustrates an example of an apparatus configuration of the PGW_A 30 and/or the UPF_A 235. As illustrated in FIG. 8, each of the PGW_A 30 and/or the UPF_A 235 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 842.

The controller_D 800 of the PGW_A 30 and/or the UPF_A 235 is a function unit for controlling the entire UPF_A 235, and implements various processes of all of the PGW_A 30 and/or the UPF_A 235 by reading out and performing various types of information and programs stored in the storage unit_D 840.

Furthermore, the network connection unit_D 820 of the PGW_A 30 and/or the UPF_A 235 is a function unit through which the PGW_A 30 and/or the UPF_A 235 connect to a DN (i.e. the DN_A 5 and/or the PDN_A 6), the SMF_A 230, another PGW_A 30 and/or the UPF_A 235, and an access network (i.e. the E-UTRAN_A 80, the 5G-RAN_A 120, the WLAN ANc 125, the WLAN ANa 70, and the WLAN ANb 75). In other words, the UPF_A 235 can transmit and/or receive user data and/or control information to and/or from the DN (i.e., the DN_A 5 and/or the PDN_A 6), the SMF_A 230, the other UPF_A 235, and the access network (i.e. the E-UTRAN_A 80, the 5G-RAN_A 120, the WLAN ANc 125, the WLAN ANa 70, and the WLAN ANb 75) via the network connection unit_D 820.

Furthermore, the storage unit_D 840 of the PGW_A 30 and/or the UPF_A 235 is a function unit for storing programs, data, and the like necessary for each operation of the PGW_A 30 and/or the UPF_A 235. The storage unit_D 840 of the PGW_A 30 and/or the UPF_A 235 includes, for example, a semiconductor memory, an HDD, an SSD, or the like. The storage unit_D 840 of the PGW_A 30 and/or the UPF_A 235 stores identification information, control information, a flag, a parameter, and the like included in a control message which is transmitted and/or received in the communication procedure described below. In addition, examples of the context 842 stored in the storage unit_D 840 of the PGW_A 30 and/or the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an assigned session type, IP address (es), an SGW F-TEID, a PGWF-TEID, and a default bearer. The context stored for each bearer may include an EPS bearer ID, a TFT, an SGW F-TEID, and a PGW F-TEID.

1.2.6. Configuration of CSCF

Figure 9:
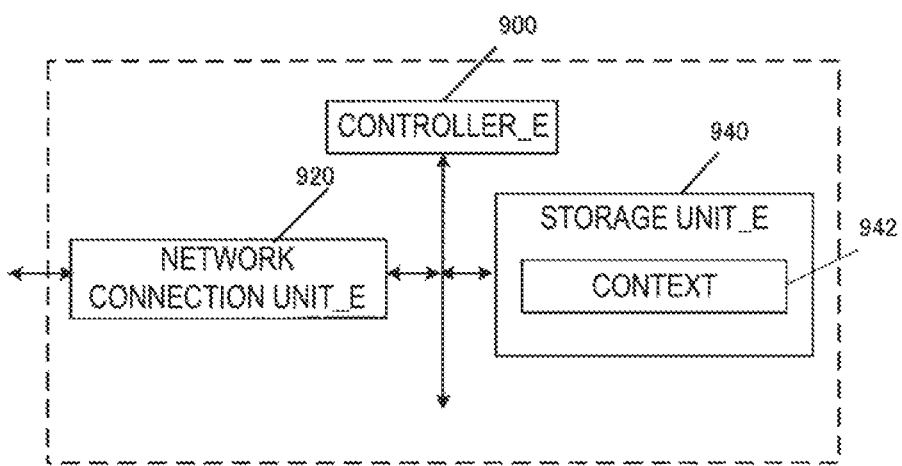
FIG. 9 is a diagram illustrating an apparatus configuration of a CSCF.

Next, FIG. 9 illustrates an example of a configuration of the CSCF. As illustrated in FIG. 9, the CSCF includes a controller_E 900, a network connection unit_E 920, and a storage unit_E 940. The network connection unit_E 920 and the storage unit_E 940 are connected to the controller_E 900 via a bus. In addition, the storage unit_E 940 stores a context 942.

The controller_E 900 of the CSCF is a function unit for controlling the entire CSCF and implements various processes of the entire CSCF by reading out and performing various types of information and programs stored in the storage unit_E 940.

Furthermore, the network connection unit_E 920 of the CSCF is a function unit through which the CSCF connects to another CSCF, the UPF_A 235, the PGW_A 30, the HSS_A 50, and the UDM_A 245. In other words, the CSCF can transmit and/or receive user data and/or control information to and/or from the other CSCF, the UPF_A 235, the PGW_A 30, the HSS_A 50, and the UDM_A 245 via the network connection unit_E 920.

In addition, the storage unit_E 940 of the CSCF is a function unit for storing programs, data, and the like necessary for each operation of the CSCF. The storage unit_E 940 includes, for example, a semiconductor memory, an HDD, an SSD, or the like. The storage unit_E 940 stores identification information, control information, a flag, a parameter, and the like included in a control message which is transmitted and/or received in the communication procedure described below. The context 942 stored in the storage unit_E 940 may include a context stored for each UE, an IMSI, an MSISDN, a UE address, public user ID(s), private user ID(s), an access network type, and a session status (session state information).

1.2.7. Information Stored in Storage Unit of Each Apparatus

Next, each piece of information stored in the storage unit of each of the above-described apparatuses will be described.

The International Mobile Subscriber Identity (IMSI) and/or the Subscriber Permanent identifier (SUPI) are permanent identification information of a subscriber (user) and is identification information assigned to a user using the UE. The IMSI and/or the SUPI stored by the UE_A 10, the MME_A 40/CPF_A 140/AMF_A 2400, and the SGW_A 35 may be the same as the IMSI and/or the SUPI stored by the HSS_A 50 and/or the UDM_A 245. Here, the SUPI may include the IMSI.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEED of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including one or more pieces of information necessary for the SGSN with respect to the UE_A 10 having a function of the GERAN_A 25 and/or the UTRAN_A 20, The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID. Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating a correspondence relationship between the DN ID and the APN, perform a procedure to inquire the APN by using the DN ID, or perform a procedure to inquire the DN ID by using the APN.

The SCEF ID is an IP address of the SCEF used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with PDN connection/PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG_A 126. The WAG ID is information for identifying the WAG_A 126.

1.3. Description of Initial Procedure for Core Network_B

Next, before describing the detailed steps of initial procedure for the core network_B in the present embodiment, terminologies specific to the present embodiment and primary identification information used in each procedure will be described beforehand in order to avoid overlapping descriptions.

First, a first state is a state in which network capability information of the core network_B 190 and/or the core network_A 90 acquired by UE_A 10 is held.

Furthermore, the UE_A 10 may acquire the network capability information in a registration procedure with respect to the core network_B 190. Furthermore, the network capability information acquisition by the UE_A 10 is not limited to the registration procedure with respect to the core network, and the acquisition may be based on identification information included in a message transmitted and/or received in a procedure between the UE_A 10 and an AN and/or an apparatus constituting the AN, or may be based on reception of identification information included in a message transmitted as broadcast information from the AN and/or the apparatus constituting the AN.

Note that the network capability information acquired and held by the UE_A 10 in the first state during the registration procedure may include information related to support of the voice call service function of the core network_B and/or the core network_A 90 and/or information related to bearer support for the emergency call.

Furthermore, the first state may be a state in which the UE_A 10 acquires and holds the capability information of the core network with which the registration procedure is not performed during the registration procedure. Here, the core network with which the registration procedure is not performed may be another core network in the same PLMN.

In other words, the first state may be a state in which the UE_A 10 requests, acquires, and holds the capability information of the core network_B 190 in the registration procedure with respect to the core network_A 90 or may be a state in which the UE_A 10 requests, acquires, and holds the capability information of the core network_A in the registration procedure with respect to the core network_B 190. Here, the capability information of the network may include information related to support of the voice call service function and/or bearer support dedicated to emergency call.

In addition, a second state is a state in which registration with respect to the IMS_A 7 is completed via the core network with which the UE_A 10 has been registered, and the UE_A 10 is ready to use the services provided by the IMS_A 7. Here, the registration with the IMS may be registration with the (MS for a normal call connection, and may not be registration to the IMS for emergency calls (IMS Registration for Emergency Session).

Furthermore, a tracking area (TA) is a range that can be represented by location information of the UE_A 10 managed by the core network, and may include one or more cells, for example. Furthermore, the TA may be a range in which a control message such as a paging message is broadcast, or a range in which the UE_A 10 can move without performing a handover procedure. Here, the TA may be managed individually for 3GPP-Access and non-3GPP-Access. Furthermore, a TA managed by the core network_B and a TA managed by the core network_A may be the same or different.

Furthermore, a TA list is a list including one or more TAs allocated to the UE_A 10 by the network. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

Next, the identification information in the present embodiment will be described.

First, first identification information may be information indicating a Preference (Prf) such that the UE_A 10 prioritizes the support of the voice service function and/or a bearer or a PDU session function for an emergency call, by the core network_B 190 with which the UE_A 10 attempts to register.

Furthermore, the core network_B 190 that has received a request message including the first identification information from the UE_A 10 may inquire of another core network in the same PLMN network capability information including the support of the voice service function and/or a bearer or the PDU session function for an emergency call, or the AMF_A 240 in the core network_B 190 may hold or configure the network capability information in advance.

Note that, in a case that the first identification information is transmitted in the registration procedure, the first identification information included in a registration request is preferably transmitted; however, the first identification information may be transmitted in any control message (e.g., a NAS message) other than the registration request. Furthermore, in a case that the first identification information is transmitted in the PDU session establishment procedure, the first identification information included in a PDU session establishment request is preferably transmitted; however, the first identification information may be transmitted in any control message (e.g., a NAS message) other than the PDU session establishment request. In addition, the first identification information may be transmitted in any control message (e.g., a NAS message; (Periodic) Registration Update) at any timing after the registration procedure and/or PDU session establishment procedure are completed.

Furthermore, second identification information may be information indicating that the network capability information of the core network_A 90 is requested. Furthermore, the second identification information may be information indicating that the network capability information related to support of the voice service function and/or the bearer or the PDU session function for an emergency call, by the core network_A 90 is requested.

Note that the second identification information may be included in a message transmitted from the AMF in the core network_B to the MME in the core network_A, and the message may be transmitted and/or received using the Nx interface. Here, the MME in the core network_A to which the message of (B) in the registration procedure is addressed may be determined by the AMF based on location information of the UE and/or an operator policy.

Furthermore, the MME may transmit, to the AMF, the network capability information of the core network_A included in the message of (B) in the registration procedure, based on the reception of the second identification information.

In addition, third identification information may be information indicating network capability information of the core network_A 90. Furthermore, the third identification information may be information indicating that network capability information related to support of the voice service function and/or the bearer or the PDU session function for an emergency call, by the core network_A 90.

The third identification information may be included in the message of (B) in the registration procedure, which is a response to a message of (A) in the registration procedure transmitted from the MME_A 40 in the core network_A 90 to the AMF_A 240 in the core network_B 190, and the message may be transmitted and/or received using the Nx interface.

Furthermore, the AMF_A 240 may transmit the network capability information of the core network_A 90 included in a registration accept message to the UE_A 10 based on the reception of the third identification information.

In addition, 10th identification information is capability information indicating whether the core network_B 190 supports the voice service function. The UE_A 10 may perform a subsequent normal call connection based on the reception of the 10th identification information indicating that the core network_B 190 supports the voice service function.

Furthermore, 11th identification information is capability information indicating whether the core network_B 190 supports a bearer or a PDU session function for an emergency call. The UE_A 10 may perform a subsequent emergency call connection based on the reception of the 11th identification information indicating that the core network_B supports the bearer or the PDU session function for an emergency call.

In addition, 12th identification information is identification information indicating whether another core network, the core network_A 90 for example, in the same PLMN as the core network_B 190 provides the voice service function and the bearer or the PDU session function for an emergency call.

For example, the UE_A 10 may switch to another core network providing the bearer/PDU session function for an emergency call, to perform an emergency call connection via the core network, based on the reception of the 12th identification information indicating that the other core network in the same PLMN provides the voice service function and the bearer or the PDU session service for an emergency call.

Figure 10:
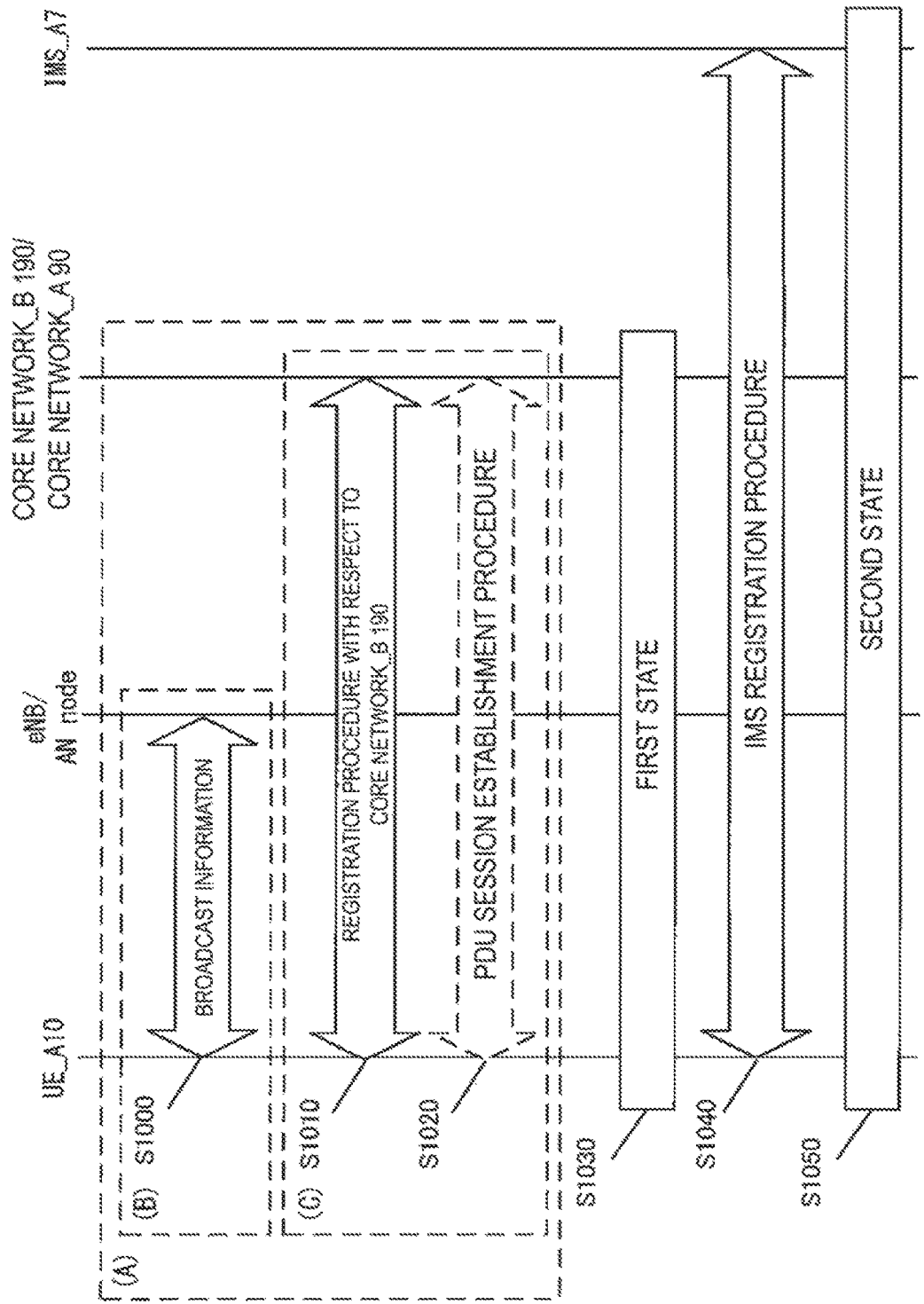
FIG. 10 is a diagram illustrating an initial procedure.

Next, an initial procedure according to the present embodiment will be described with reference to FIG. 10. Hereinafter, the initial procedure is also referred to as the present procedure, and the initial procedure (the present procedure) includes broadcast information and/or an (initial) registration procedure with respect to the core network_B 190 and/or PDU session establishment procedure and an IMS registration procedure. Details of the broadcast information, the registration procedure, the PDU session establishment procedure, and the IMS registration procedure will be described below.

Specifically, each apparatus performs the procedure (A) in the present procedure, and the UE_A 10 acquires network capability information of the core network B_190 and/or the core network_A 90, causing each apparatus to transition to the first state (S1030). Here, the UE_A 10 may acquire the network capability information of the core network_B 190 in the procedure (B) and/or the procedure (C) of the present procedure. Furthermore, the UE_A 10 may acquire the network capability information of the core network_A 90 and/or in the procedure (C) of the present procedure. Furthermore, the procedure of (B) of the present procedure may be a reception of broadcast information (S1000), and the procedure (C) of the present procedure may be a registration procedure (S1010) with respect to the core network_B 190 and a single PDU session establishment procedure (S1020). In addition, each apparatus performs the registration procedure, and the UE_A 10 may transition to a state in which it is registered in the network (RM-REGISTERED state), or each apparatus performs the PDU session establishment procedure, and the UE_A 10 may establish a PDU session with the DN that provides a PDU connection service via the core network_B 190.

Next, each apparatus performs the IMS registration procedure (S1040), and the UE_A 10 is registered in the IMS_A 7 providing an IMS service via the core network_B 190, causing each apparatus to transition to the second state (S1050). The present procedure is completed by the above procedure.

Note that each apparatus may exchange and/or acquire various pieces of capability information and/or request information of each apparatus in the reception of the broadcast information and/or the registration procedure and/or the PDU session establishment procedure. Furthermore, in a case that each apparatus exchanges various pieces of capability information and/or negotiates various requests in the registration procedure, each apparatus may not exchange various pieces of information and/or negotiate various requests in a single PDU session establishment procedure. In addition, in a case that each apparatus does not exchange various pieces of information and/or does not negotiate various requests in the registration procedure, each apparatus may exchange various pieces of information and/or negotiate various requests in the single PDU session establishment procedure. Furthermore, even in a case that each apparatus exchanges various pieces of information and/or negotiates various requests in the registration procedure, each apparatus may exchange various pieces of information and/or negotiate various requests the single PDU session establishment procedure.

In addition, each apparatus may perform the PDU session establishment procedure in the registration procedure or after the registration procedure is completed. Furthermore, in a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. In addition, in a case that the PDU session establishment procedure is performed in the registration procedure, each apparatus may establish a PDU session or may transition to the first state based on the completion of the registration procedure.

Furthermore, each apparatus involved in the present procedure may transmit and/or receive each control message described in the present procedure to transmit and/or receive one or more pieces of identification information included in each control message and store each piece of identification information transmitted and/or received as a context.

1.3.1. Overview of Broadcast Information

First, an overview of broadcast information will be described. The broadcast information may be included in a message and/or a signal and/or a beacon frame transmitted from an AN and/or an apparatus constituting the AN to the UE_A 10. Furthermore, the broadcast information may include the 10th identification information and/or the 11th identification information.

Here, the UE_A 10 may recognize whether the core network_B 190 to which the UE_A 10 attempts to connect supports the voice service based on the 10th identification information included in the broadcast information. Furthermore, the UE_A 10 may store the information in the context that the UE_A 10 holds.

In addition, the UE_A 10 may recognize, for example, whether the core network_B 190 supports the emergency call bearer based on the 11th identification information is included in the broadcast information. Furthermore, the UE_A 10 may store the information in the context that the UE_A 10 holds.

Furthermore, the UE_A 10 may transition to the state 1 based on the reception of the broadcast information/and or the completion of the registration procedure to be described below.

1.3.2. Overview of Registration Procedure

First, an overview of the registration procedure will be described. The registration procedure is a procedure initiated by the UE_A 10 to perform registration in a network (the access network and/or the core network_B 190 and/or the DN (DN_A 5 and/or PDN_A 6)). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTER ED state). In addition, each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating particular parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or deactivation of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

In addition, the UE_A 10 and/or each apparatus may transition to the first state based on the completion of the present procedure and/or the PDN session establishment procedure described below.

1.3.2.1. Example of Registration Procedure

Figure 11:
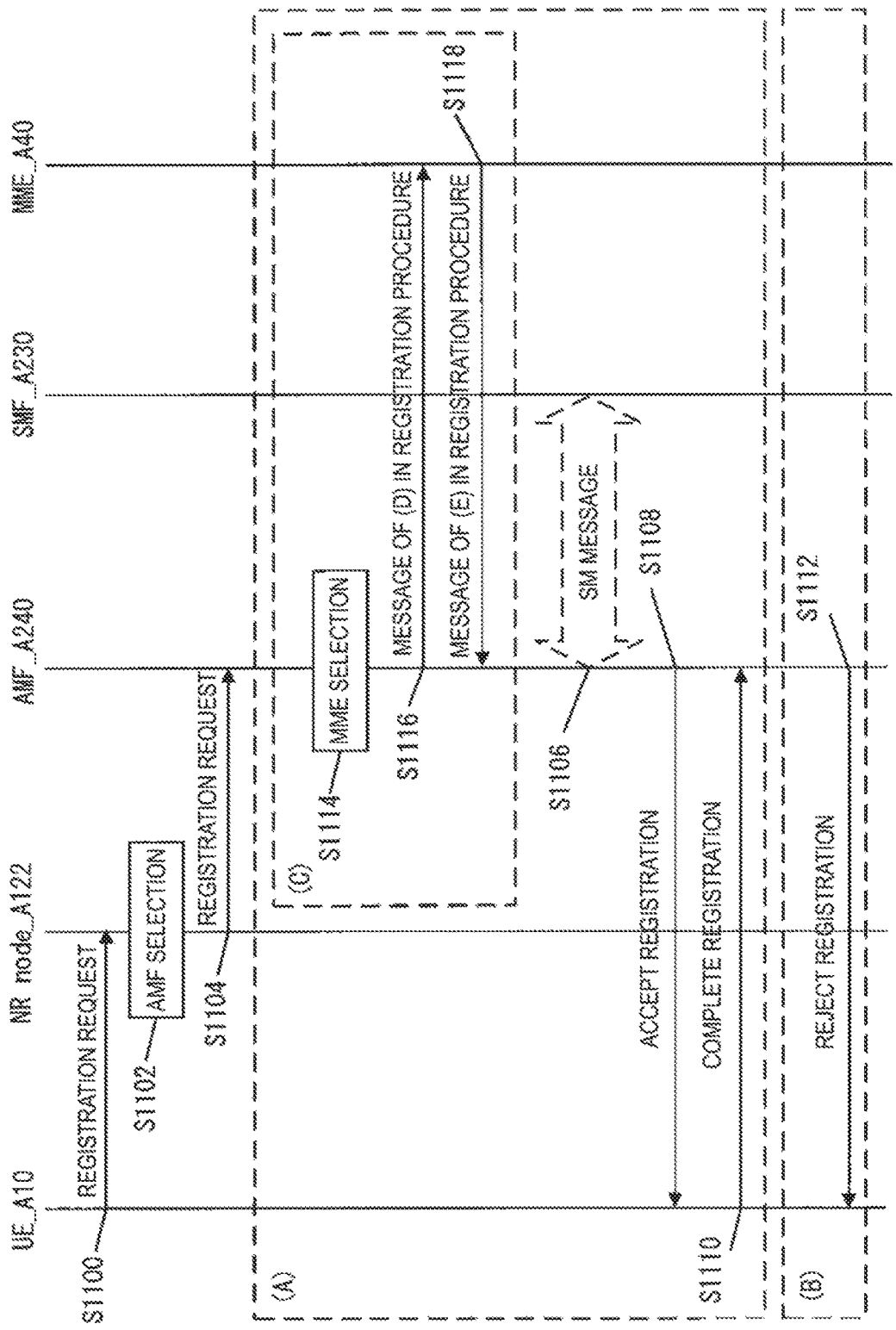
FIG. 11 is a diagram illustrating a registration procedure.

An example of processes for performing the registration procedure will be described with reference to FIG. 11. The present procedure hereinafter refers to the registration procedure. Each step of the present procedure will be described below.

First, the UE_A 10 transmits a registration request message to the AMF_A 240 via the NR node_A 122 (S1100, S1102, and S1104) to initiate the registration procedure. In addition, the UE_A 10 transmits a Session Management (SM) message (e.g., a PDU session establishment request message) included in the registration request message, or transmits the SM message (e.g., the PDU session establishment request message) along with the registration request message to initiate a procedure for SM, such as a PDU session establishment procedure, during the registration procedure.

Specifically, the UE_A 10 transmits an RRC message including the registration request message to the NR node_A 122 (S1100). In a case that the RRC message including the registration request message is received, the NR node_A 122 selects the AMF_A 240 as a NF or a common CP function to which the registration request message is routed (S1102). The NR node_A 122 retrieves the registration request message from the received RRC message and transmits or transfers the registration request message to the selected AMF_A 240 (S1104). Here, the NR node_A 122 may select the AMF_A 240 based on information included in the RRC message. Furthermore, the registration request message may be a Non-Access-Stratum (NAS) message transmitted and/or received on the N1 interface. In addition, the RRC message may be a control message transmitted and/or received between the UE_A 10 and the NR node_A 122. Furthermore, the NAS message may be processed in a NAS layer, the RRC message may be processed in an RRC layer, and the NAS layer may be a higher layer than the RRC layer.

In addition, in a case that there are multiple NSIs requesting registration, the UE_A 10 may transmit a registration request message for each of the NSIs, or may transmit multiple registration request messages included in one or more RRC messages. Furthermore, the above-described multiple registration request messages included in one or more RRC messages may be transmitted as one registration request message.

Here, the UE_A 10 may include the first identification information in the registration request message and/or the RRC message.

Furthermore, the UE_A 10 may transmit the first identification information to indicate that the UE_A 10 prioritizes or requests the IMS emergency call connection using an emergency call-dedicated PDU session or an emergency call-dedicated bearer in a case that the IMS emergency call connection is performed.

Note that the UE_A 10 may determine whether the first identification information is to be included in the registration request message based on capability information of the UE_A 10, and/or a policy such as a UE policy, and/or preference of the UE_A 10.

In addition, the UE_A 10 may transmit the first identification information to indicate a request of an inquiry about network capability information including support of the voice service function and/or an emergency call-dedicated PDU session function, or an emergency call-dedicated bearer function, the inquiry being made to another core network (e.g., the core network_A 90) in the same PLMN that is overlapping with the location registration area of the UE_A 10.

Furthermore, the UE_A 10 may transmit the first identification information to indicate that UE_A 10 has the capability of supporting PDU session establishment with the core network_A 90, and further indicate that the UE_A 10 has the capability of supporting the procedure that uses the voice service and/or emergency call via the core network_A 90.

In addition, the UE_A 10 may transmit the first identification information included in a control message different from the registration request message (e.g., NAS message or RRC message).

The AMF_A 240 receives the registration request message and/or the control message different from the registration request message and performs first condition determination. The first condition determination is intended to determine whether the network accepts a request from the UE_A 10. The AMF_A 240 initiates the procedure of (A) in the present procedure in a case that the first condition determination is true, and initiates the procedure of (B) in the present procedure in a case that the first condition determination is false.

Each step of the procedure of (A) in the present procedure will be described below. The AMF_A 240 performs fifth condition determination and/or fourth condition determination, and initiates the procedure of (A) in the present procedure. Here, the order for performing the fifth condition determination and the fourth condition determination is not limited. Specifically, the fourth condition determination may be performed after the fifth condition determination is performed, for example, or, conversely, the fifth condition determination may be performed after the fourth condition determination is performed, or the fifth condition determination and the fourth condition determination may be performed simultaneously.

First, the fifth condition determination is for determining whether the AMF_A 240 performs the procedure of (C) in the present procedure. In a case that the fifth condition determination is true, the AMF_A 240 selects the MME_A 40 (S1114), and transmits the message of (D) in the registration procedure to the selected MME_A 40 (S1116), and receives the message of (E) in the registration procedure from the MME_A 40 (S1118). In a case that the fifth condition determination is false, the AMF_A 240 skips such processes.

Note that, based on the location registration area of the UE_A 10 and/or network policies and/or configurations of apparatuses including the AMF_A 240, the AMF_A 240 may select the MME_A 40 in another core network, the core network_A 90 for example, in the same PLMN, the other core network overlapping with the location registration area of the core network_B 190 in which the UE_A 10 attempts to be registered in the registration procedure.

In addition, the AMF_A 240 may include the second identification information in the message of (D) during the registration procedure, and thereby may indicate, to the MME_A 40 in the core network, a request of capability information related to the support of the voice service and/or the emergency call bearer by another core network, the core network_A 90 for example, in the same PLMN, the other core network overlapping with the location registration area of the core network_B 190 with which the UE_A 10 attempts registration in the registration procedure.

In addition, the MME_A 40 may include the third identification information in the message of (E) in the registration procedure, and thereby may indicate network capability information on the support of the voice service and/or emergency call bearer of the core network. Furthermore, the message of (E) in the registration procedure may be a response message to the message of (D) from the MME_A 40 to the AMF_A 240 in the registration procedure. Furthermore, the message of (E) in the registration procedure may be an accept message or a reject message, and in a case that the message of (E) in the registration procedure is a message that means acceptance, any of the presence or absence of the network capability information related to the support of the voice service and/or emergency call bearer may be indicated. Hereinafter, unless otherwise noted, it is assumed that the message is an accept message and the core network has the network capability of the support of the voice service and/or emergency call bearer.

Next, the fourth condition determination is for determining whether the AMF_A 240 transmits and/or receive a SM message to and/or from the SMF_A 230. In a case that the fourth condition determination is true, the AMF_A 240 select the SMF_A 230 and transmits and/or receive the SM message to and/or from the selected SMF_A 230. In a case that the fourth condition determination is false, the AMF_A 240 skips such processes (S1106).

In addition, the AMF_A 240 transmits a registration accept (Registration Accept) message to the UE_A 10 via the NR node_A 122 based on reception of the registration request message from the UE_A 10 and/or completion of transmission and/or reception of the SM message to and/or from the SMF_A 230 and/or completion of the procedure of (C) in the present procedure (S1108). Here, the registration accept message included in the control message and the RRC message of the N2 interface may be transmitted and/or received. Furthermore, the registration accept message may be a NAS message to be transmitted and/or received on the N1 interface. In addition, the registration accept message may be a response message to the registration request message.

Note that, in a case that the message of (E) in the registration procedure indicating rejection from the MME_A 40 is received, the AMF_A 240 may complete the procedure of (C) in the present procedure, and performs the subsequent procedure in the procedure of (A) in the present procedure.

Note that in a case that the AMF_A 240 receives an SM message indicating rejection from the SMF_A 230, the AMF_A 240 may terminate the procedure of (A) in the present procedure, and may initiate the procedure of (B) in the present procedure.

Furthermore, in a case that the fifth condition determination is true, the AMF_A 240 may transmit the message of (E), received from MME_A 40 in the registration procedure, that is included in the registration accept message.

Further, in a case that the fourth condition determination is true, the AMF_A 240 may transmit the SM message such as a PDU session establishment accept message (e.g., a PDU session establishment accept message) included in the registration accept message, or transmit the SM message such as a PDU session establishment accept message (e.g., a PDU session establishment accept message) along with the registration accept message. In addition, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

In addition, the AMF_A 240 may include the 10th to 12th identification information in the registration accept message, and thereby may indicate that the request from the UE_A 10 has been accepted, and network capability information is acquired, the network capability information being related to the support of the voice service and/or emergency call bearer by the core network_B 190 and/or another core network, the core network_A 90 for example, in the same PLMN.

Note that the AMF_A 240 may determine whether the 10th to the 12th identification information is to be included in the registration accept message based on received identification information, and/or network capability information and/or an operator policy, and/or a network state, and/or user registration information (user subscription), and the like. For example, in a case that the first identification information is received from the UE_A 10, it may be information transmitted to the UE_A 10.

The UE_A 10 receives a registration accept message via the NR node_A 122 (S1108). The UE_A 10 receives the registration accept message and recognizes the contents of various types of identification information included in the registration accept message.

For example, the UE_A 10 may recognize whether the core network_B 190 with which the UE_A 10 attempts the registration procedure supports the voice service, based on the 10th identification information included in the registration accept message. Furthermore, the UE_A 10 may store these pieces of information in the context that the UE_A 10 holds. The UE_A 10 may perform a normal call connection after the initial procedure is completed, based on the reception of the 10th identification information indicating that the core network_B 190 supports the voice service. Conversely, in a case that the 10th identification information indicating that the core network_B 190 does not support the voice service has been received, the UE_A 10 does not perform the normal call connection after the initial procedure is completed.

Furthermore, for example, the UE_A 10 may recognize whether the core network_B 190 supports the emergency call bearer based on the 11th identification information included in the registration accept message. Furthermore, the UE_A 10 may store the information in the context that the UE_A 10 holds.

Furthermore, for example, the UE_A 10 may recognize whether the voice service and/or the emergency call bearer of another core network, the core network_A 90 for example, in the same PLMN as the core network_B 190, is supported based on the 12th identification information included in the registration accept message. Furthermore, the UE_A 10 may store these pieces of information in the context that the UE_A 10 holds.

Furthermore, in a case that the UE_A 10 receives the 10th identification information indicating that the voice service is supported, the UE_A 10 may further perform a subsequent normal call and/or emergency call connection based on the 11th identification information.

Furthermore, in a case that the UE_A 10 has received the 12th identification information indicating that another core network, the core network_A 90 for example, in the same PLMN supports the voice service and the emergency call bearer service, the UE_A 10 may switch to the core network_A 90 and make an emergency call connection via the core network_A 90. Further, in a case that the UE_A 10 has received the 10th identification information indicating that the core network_B 190 supports the voice service, and the 11th identification information indicating that the core network_B 190 supports the emergency call bearer, and in a case that the 12th identification information indicating that the core network_A 90 does not support the voice service and the emergency call bearer service, the UE_A 10 may make an emergency call connection via the core network_B 190.

The UE_A 10 may further transmit a registration completion (Registration Complete) message to the AMF_A 240 (SI 110). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be a NAS message transmitted and/or received on the N1 interface. In addition, the registration complete message may be a response message to the registration accept message. Further, the registration complete message included in the RRC message and a control message of the N2 interface may be transmitted and/or received.

The AMF_A 240 receives the registration complete message (S1110). In addition, each apparatus completes the procedure of (A) in the present procedure based on the transmission and/or reception of the registration accept message and/or the registration complete message.

Next, each step of the procedure of (B) in the present procedure will be described. The AMF_A 240 transmits a registration reject (Registration Reject) message to the UE_A 10 via the NR node_A 122 (S112) to initiate the procedure of (B) in the present procedure. Furthermore, the UE_A 10 recognizes that a request of the UE_A 10 has been rejected by receiving the registration reject message or not receiving the registration accept message. Each apparatus completes the procedure of (B) in the present procedure based on the transmission and/or reception of the registration reject message.

Note that, in a case that the fourth condition determination is true, the AMF_A 240 may transmit an SM message such as a PDU session establishment reject message indicating rejection in the registration reject message, or may include the SM message indicating rejection therein to indicate that the procedure for SM has been rejected. In that case, the UE_A 10 may further receive the SM message, such as the PDU session establishment reject message, that indicates rejection, or may recognize that the procedure for SM has been rejected.

Furthermore, the registration reject message may be a NAS message transmitted/received on the N1 interface. In addition, the registration reject message may be a response message to the registration request message. Further, the registration reject message transmitted by the AMF_A 240 is not limited thereto as long as it is a message for rejecting the request of the UE_A 10. In addition, the registration reject message included in the control message and the RRC message on the N2 interface may be transmitted and/or received.

The UE_A 10 recognizes the contents of various types of identification information included in the registration reject message by receiving the registration reject message.

Furthermore, the first condition determination may be performed based on identification information, and/or subscriber information, and/or an operator policy included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Note that conditions for determining whether the first condition determination is true or false may not be limited to the above-described conditions.

In addition, the fifth condition determination may be performed by the AMF_A 240 based on the first identification information included in the registration request message, or may be performed based on capability information indicating whether the voice service and/or the emergency call bearer of the core network_B 190 is supported. For example, the fifth condition determination may be true in a case that the AMF_A 240 includes the first identification information in the registration request message from the UE_A 10 and/or in a case that the core network_B 190 does not support the support of the voice service and/or the emergency call bearer, or may be false in a case that the AMF_A 240 does not include the first identification information in the registration request message from the UE_A 10 and/or in a case that the core network_B supports the voice service and/or the emergency call bearer. Note that conditions for determining whether the fifth condition determination is true or false may not be limited to the above-described conditions.

The fourth condition determination may also be performed based on whether AMF_A 240 has received an SM and may be performed based on whether a SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

Note that the order in which the fifth condition determination and the fourth condition determination are performed may be determined based on the identification information, and/or the subscriber information, and/or the apparatus configuration in the core network including the AMF_A 240, and/or the operator policy included in the registration request message.

1.3.3. Overview of PDU Session Establishment Procedure

Next, an overview of the PDU session establishment procedure performed to establish a PDU session with the DN_A 5 will be described. The PDU session establishment procedure is also referred to as a present procedure below. The present procedure is a procedure for each apparatus to establish the PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. Each apparatus may establish the PDU session, based on completion of the PDU session establishment procedure. Furthermore, the UE_A 10 may acquire an address of the P-CSCF based on the completion of the present procedure. Furthermore, the UE_A 10 may acquire network capability information of the core network_B 190 and/or the core network_A 90, and each apparatus may transition to the first state based on the completion of the present procedure. Furthermore, each apparatus may perform the present procedure multiple times to establish multiple PDU sessions.

In addition, the UE_A 10 and/or each apparatus in the core network may transition to the first state based on completion of the present procedure and/or completion of the procedure of the registration to the core network described above.

1.3.4. Summary of IMS Registration Procedure

First, an overview of an IMS registration procedure will be described. The present procedure may be initiated based on the second state of the UE_A 10 and/or each apparatus in the core network. Note that the IMS registration procedure is a UE_A 10 initiated procedure for registration to the IMS. The UE_A 10 may initiate the present procedure at any time in a case that the UE_A 10 is not registered to IMS, that is, an IP address of the UE_A 10 is not associated with a public user identity assigned from a network. In addition, the UE_A 10 and each IMS apparatus may also recognize a state of being registered, that is, the IP address of the UE_A 10 is associated with the public user identity assigned from the network based on completion of IMS registration, and may also transition to the second state.

Furthermore, the present procedure determines the path of the Session Initiation Protocol (SIP) message in the IMS procedure after the IMS registration procedure.

1.3.4.1. Example of IMS Registration Procedure

Figure 12:
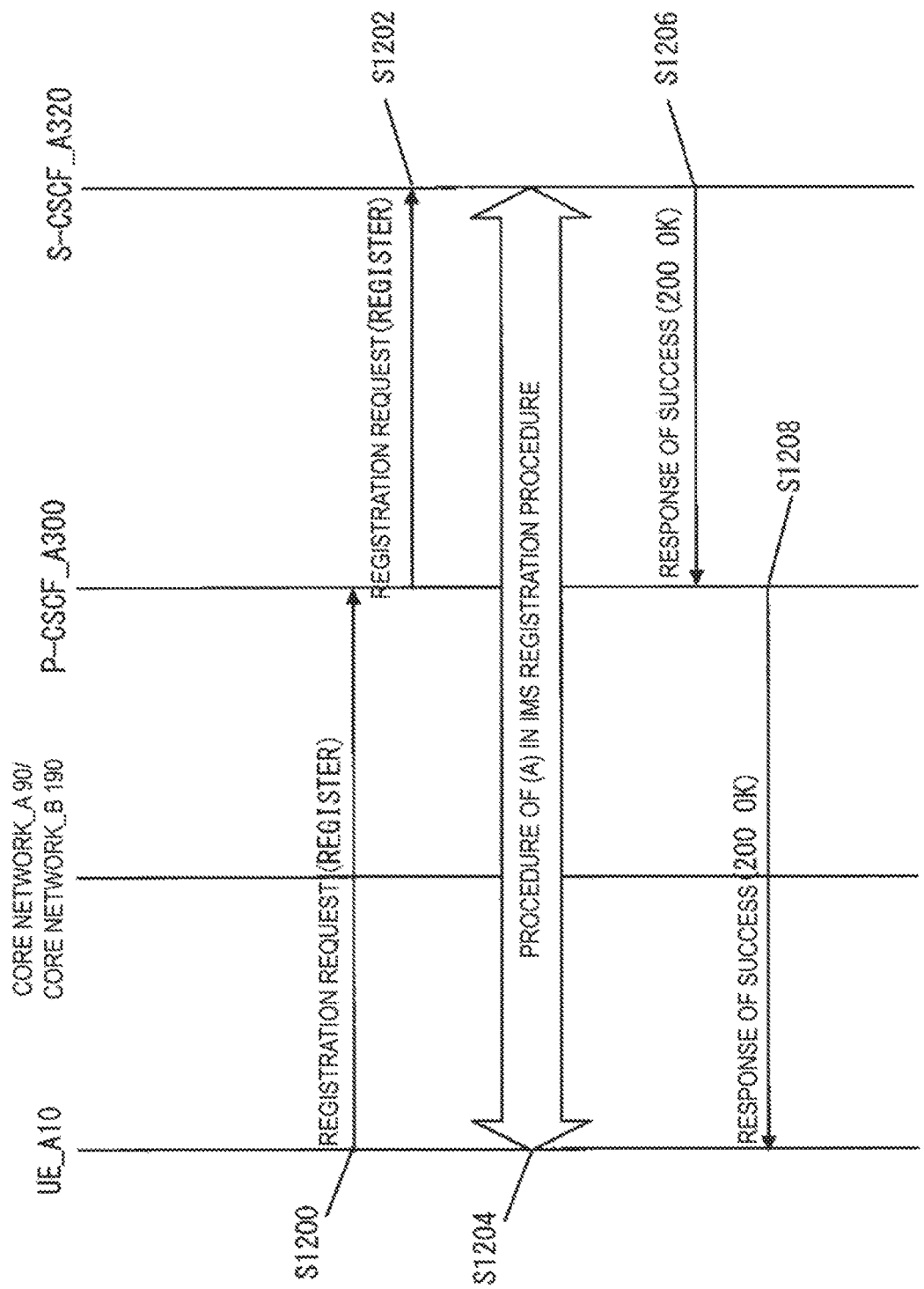
FIG. 12 is a diagram illustrating an IMS registration procedure.

An example of an order of the IMS registration procedure will be described using FIG. 12. The present procedure hereinafter indicates the IMS registration procedure. Each step of the present procedure will be described below.

First, the UE_A 10 transmits a REGISTER signal for a normal IMS registration request to the P-CSCF_A 300 (S1200). The P-CSCF_A 300 that has received the REGISTER signal transfers the REGISTER signal to the S-CSCF_A 320 via the I-CSCF, the ATCF, or the IBCF based on service area information of the UE_A 10 and the operator policy for the signal path (S1202). The S-CSCF_A 320 that has received the REGISTER signal associates the contact address included in the Contact header with the public user identity to be registered to create and hold IMS registration information. The S-CSCF that has created the normal IMS registration information transmits, to the UE_A 10, "200 OK" including information indicating that the IMS registration has been completed as a response to the IMS registration request (S1206) (S1208).

Further, the UE_A 10 and/or each apparatus and/or each IMS apparatus in the core network may transition to the second state based on the completion of the present procedure.

1.4. Description of IMS Emergency Call Connection Procedure and IMS Emergency Call Reconnection Procedure in a Case that UE has Difficulty in Recognizing Emergency Call Next, before detailed processes of a call connection procedure according to the present embodiment are described, specific terminology and primary identification information used in each procedure according to the present embodiment will be described beforehand in order to avoid overlapping descriptions.

First, since the second state is the same as that described above, description thereof is omitted.

Next, a third state is a state in which, a user equipment such as the UE_A 10 requests, as a normal call, connection of a call that the UE_A 10 cannot recognize as an emergency call, and as a result of the request, the UE_A 10 is notified via the core network by the IMS_A 7 that the call connection request is of an emergency call, and has received information indicating rejection or redirection.

Furthermore, the third state may be a state in which the UE_A 10 has acquired and held network capability information including information related to support of the voice call service function and/or support of the emergency call-dedicated bearer by the core network_B 190 and/or the core network_A 90.

Furthermore, the UE_A 10 in the third state may initiate the emergency call connection procedure via the network that can connect the emergency call based on the network capability information that has been acquired and held.

Next, the identification information in the present embodiment will be described.

First, 21st identification information is information indicating a connection destination requested by the UE_A 10, and may be a request URI or the destination number configured in the To header.

Furthermore, an IMS connection destination indicated by the 21st identification information may be information indicating a destination of a connection which the UE_A 10 cannot recognize as an emergency call (emergency call number) (Non UE detectable Emergency Session/call).

For example, the 21st identification information may be information indicating an emergency call number to which a prefix number dialed by the user and/or the subscriber is added not to inform the outgoing telephone number. Specifically, for example, an emergency call number to which "184" is added may be used in Japan.

In addition, 22nd identification information is identification information indicating that the call connection requested by the UE_A 10 is an emergency call connection. More specifically, it is information indicating rejection or redirection by the IMS_A 7 to indicate that the request transmitted by the UE_A 10 to the IMS_A 7 via the core network is INVITE for the emergency call connection.

Furthermore, the 22nd identification information is information indicating that the call connection requested by the UE_A 10 is an emergency call connection, and in addition, indicating a procedure recommended for the UE_A 10 to perform a subsequent emergency call connection.

In addition, the 23rd identification information may be identification information indicating another core network in the same PLMN supporting the voice service function and the emergency call bearer or the PDU session function, and may be identification information that prompts the UE_A 10 to make an emergency call connection via the core network. Furthermore, the IMS_A 7 may transmit the information to the UE_A 10 via the core network as a response to the INVITE transmitted by the UE_A 10.

Figure 13:
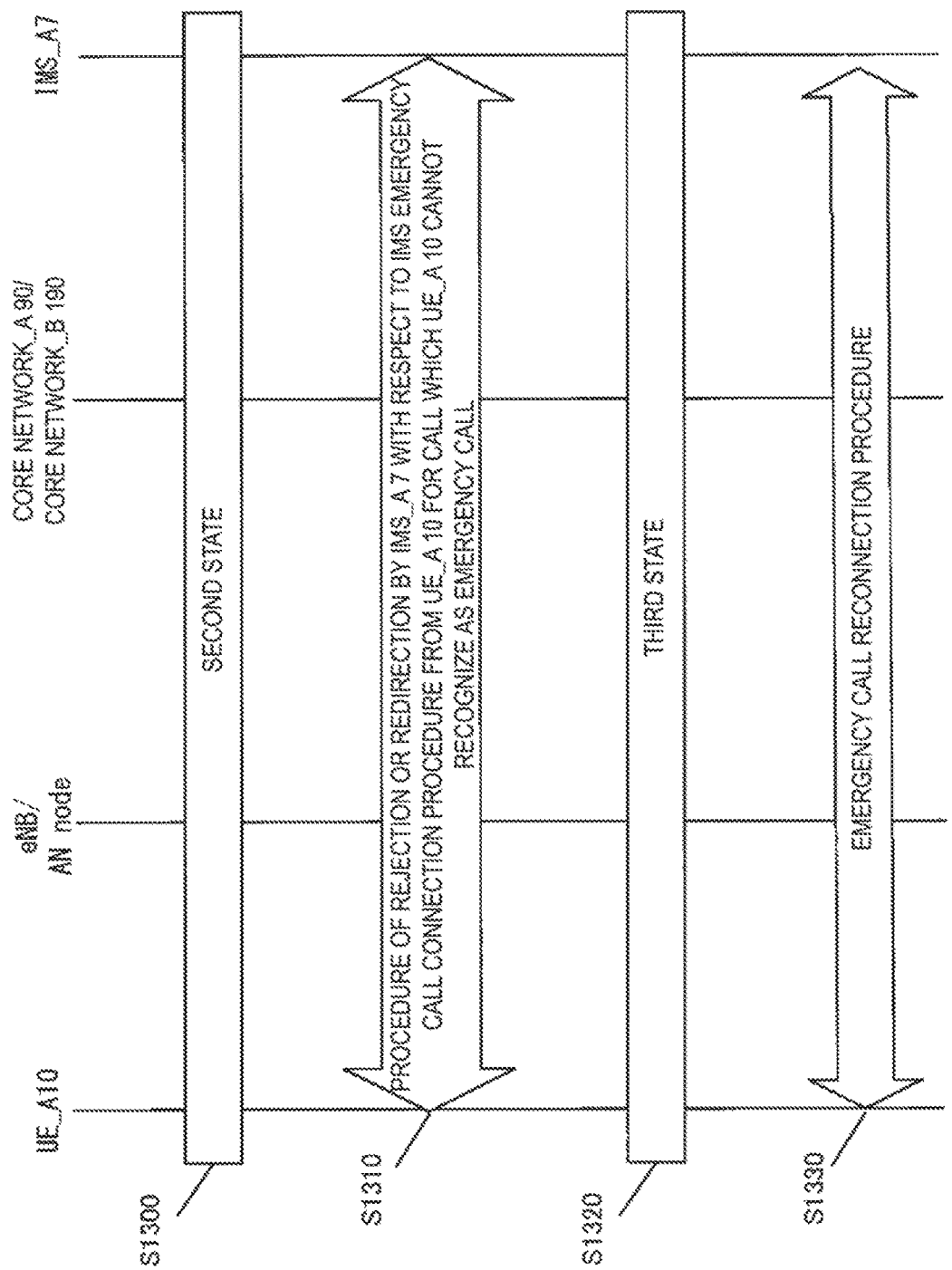
FIG. 13 is a diagram illustrating an IMS emergency call connection procedure and an IMS emergency call reconnection procedure in a case that UE has difficulty in recognizing an emergency call.

Next, the emergency call connection procedure in the present embodiment will be described using FIG. 13. Hereinafter, the emergency call connection procedure is also referred to as the present procedure, and the emergency call connection procedure (the present procedure) includes the IMS emergency call connection procedure and/or the emergency call reconnection procedure via the IMS_A 7 in which the UE_A 10 cannot recognize that a call is an emergency call. Details of each of the present procedure will be described below.

Specifically, after the completion of the initial procedure described above, the UE_A 10, and each IMS apparatus and/or each apparatus in the core network that have transitioned to the second state may perform the subsequent procedures (S1300).

Next, with respect to the IMS emergency call connection procedure from the UE_A 10 for a call which the UE_A 10 cannot recognize as an emergency call, the IMS_A 7 performs a rejection or redirection procedure (S1310), and the UE_A 10 and each IMS apparatus and/or each apparatus in the core network transition to the third state (S1320).

Next, the UE_A 10 performs the IMS emergency call reconnection (S1330). Here, the UE_A 10 may perform the IMS emergency call connection again for the core network to which the UE_A 10 is connected or the IMS emergency call connection to another core network in the same PLMN. The present procedure is completed as described above.

1.4.1. Overview of Procedure for Notification of Error Response from IMS to IMS Emergency Call Connection Request from UE for Call which UE Cannot Recognize as Emergency Call First, an overview of a procedure for notification of an error response from the IMS to the IMS emergency call connection request from the UE for a call which the UE cannot recognize as an emergency call will be described. The present procedure may include an IMS emergency call connection procedure and a procedure in which the IMS emergency call connection signal is rejected or redirected in a case that the UE cannot recognize an emergency call. Details of each procedure will be described below.

Figure 14:
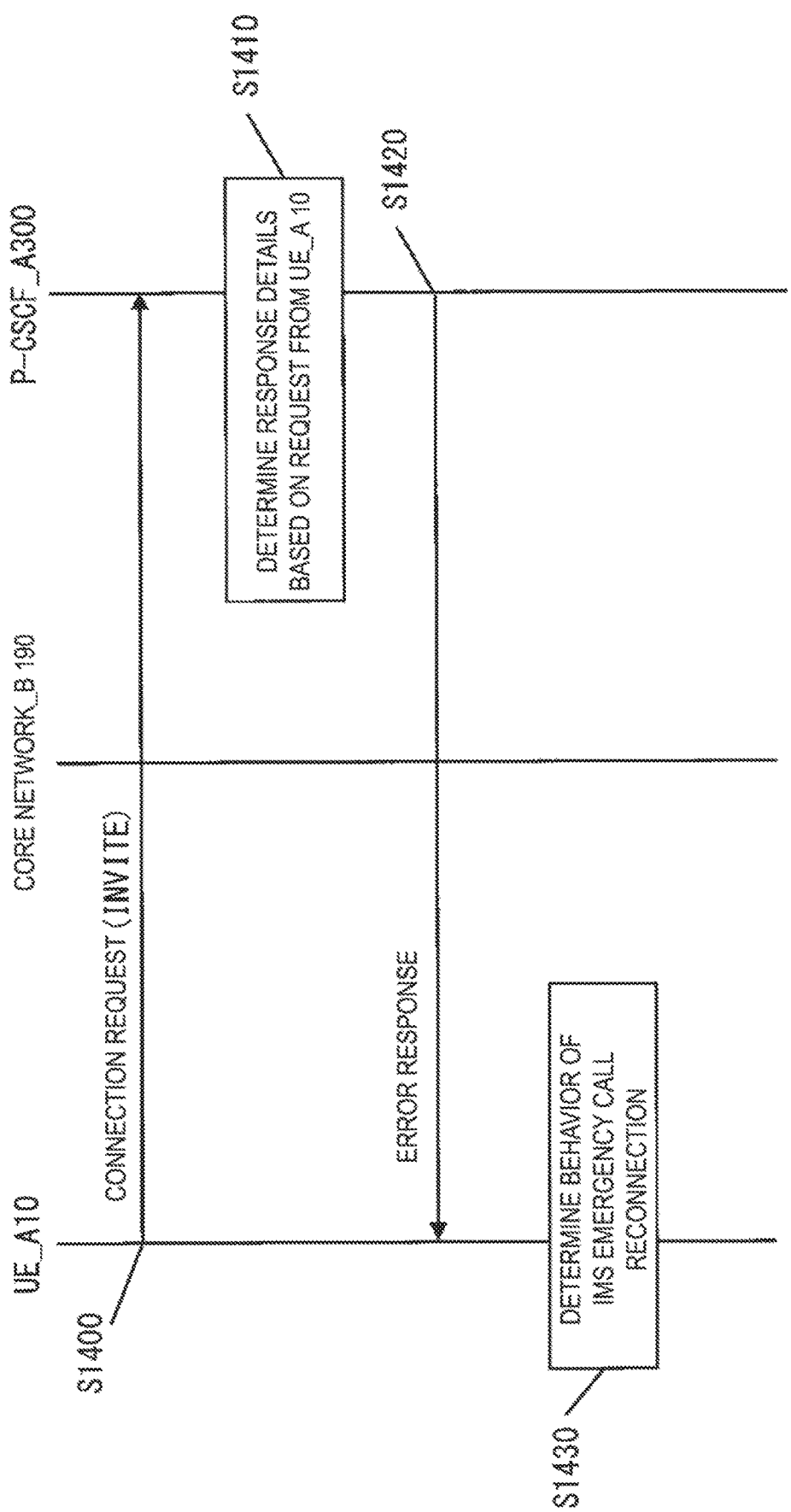
FIG. 14 is a diagram illustrating a procedure for notifying an error response from an IMS in response to an IMS emergency call connection request from UE for a call which the UE cannot recognize as an emergency call.

1.4.1.1. Description of IMS Emergency Call Connection Procedure from UE for Call which UE Cannot Recognize as Emergency Call An IMS emergency call connection procedure from the UE for a call which the UE cannot recognize as an emergency call will be described using FIG. 14.

First, the UE_A 10 transmits a connection request (INVITE) signal for a normal call connection to the P-CSCF_A 300 (S1400). Here, the UE_A 10 may transmit to the P-CSCF_A 300 the connection request (INVITE) signal including the 21st identification information. Furthermore, the connection request (INVITE) signal including the 21st identification information may be an IMS emergency call connection signal in a case that the UE_A 10 cannot recognize an emergency call. In other words, the IMS emergency call connection signal including the 21st identification information may be an IMS emergency call connection signal transmitted in the case that the UE_A 10 cannot recognize an emergency call.

Note that the 21st identification information may be an emergency call number which the UE_A 10 cannot recognize as an emergency call, and is an emergency call number that is not stored in the UE_A 10 or that has not been downloaded from the network during network registration. For example, the number may be an emergency call number to which a user adds a number-withheld call prefix number at the beginning of the dialing number, and in a case that the user dials the emergency call number, the UE_A 10 cannot recognize that it is an emergency call and makes a normal call connection rather than an emergency call connection.

Specifically, the 21st identification information is an emergency call number which the UE_A 10 cannot recognize as an emergency call, and in a case that the UE_A 10 uses such an emergency call number, the UE_A 10 determines that the number is not an emergency call number as a result of comparing the number to the emergency call number held by the UE_A 10, and transmits to the IMS_A 7 the INVITE signal for the normal call connection rather than the INVITE signal for the emergency call. More specifically, the UE_A 10 configures a path of the SIP signal based on the path information received in the IMS registration described above, and transmits, to the P-CSCF for which the path is configured, the INVITE signal for the normal call connection in which the number-withheld emergency call number is configured in a request URI or To header.

1.4.1.2. Description of Procedure for Notification of Error Response from IMS Next, a procedure for notification of an error response from IMS will be described using FIG. 14.

First, the P-CSCF_A 300 checks a connection destination of the aforementioned connection request (INVITE) based on the connection request (INVITE) transmitted by the UE_A 10 (S1400), and in a case that the connection destination is detected as an emergency call number (S1410), a reject or redirection message to notify the UE_A 10 of the emergency call connection is transmitted (S1420). The UE_A 10 determines the behavior of the IMS emergency call reconnection and completes the present procedure (S1430).

Note that the reject or redirection message may be a response to the connection request (INVITE) signal and further may be an error message of SIP "3XX," "4XX," "5XX," or "6XX."

Note that the connection request (INVITE) signal received by the P-CSCF_A 300 may include the 21st identification information, and the P-CSCF_A 300 may detect, based on the 21st identification information, that the connection destination of the UE_A 10 is the emergency call number.

Furthermore, the P-CSCF_A 300 may transmit the reject or redirection message including the 22nd identification information and/or the 23rd identification information.

In addition, the P-CSCF_A 300 may include the 23rd identification information to indicate network capability information related to the support of the voice service function and the emergency call bearer of another core network in the same PLMN.

Furthermore, the UE_A 10 may determine, based on the reception of the 22nd identification information and or the 23rd identification information, a core network with which the UE_A 10 performs the emergency call reconnection procedure described below.

Specifically, an emergency URN explicitly indicating an emergency call connection may be configured in the Contact header of the reject or redirection message and may be transmitted to the UE_A 10. For example, in a case of emergency call to police, "urn: service: sos.police" which is a dedicated emergency service URN is configured in the IMS emergency call connection signal. Here, the P-CSCF_A 300 may include, in the reject or redirection message, information that prompts the IMS emergency call connection to another core network supporting the voice service function and an emergency call-dedicated PDU session function in the same PLMN.

1.4.2. Overview of Reconnection Procedure for IMS Emergency Call from UE

Next, an overview of a reconnection procedure for an IMS emergency call from the UE will be described. The present procedure may include an IMS emergency call reconnection procedure using an emergency call-dedicated PDU session and/or an IMS emergency call reconnection procedure using a normal PDU session and/or a Circuit Switching (CS) emergency call connection procedure. Details of each procedure will be described below.

Figure 15:
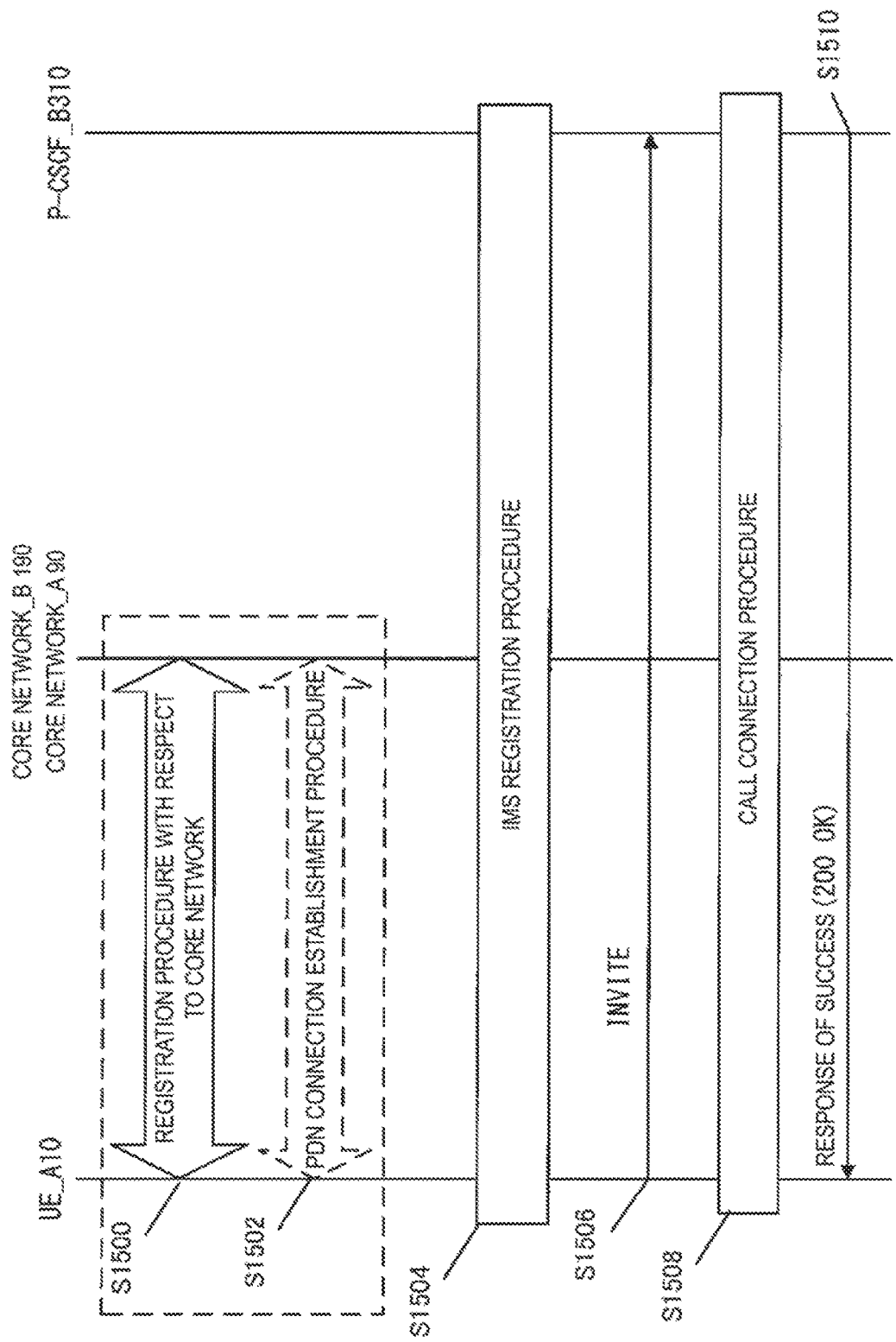
FIG. 15 is a diagram illustrating a procedure for reconnecting an IMS emergency call from UE.

1.4.2.1. Description of IMS Emergency Call Reconnection Procedure Using Emergency Call-Dedicated PDU Session The IMS emergency call reconnection procedure using an emergency call-dedicated PDU session will be described using FIG. 15.

First, the UE_A 10 that has received the reject or redirection message from the IMS_A 7 detects whether the core network to which the UE_A 10 is connected supports the emergency call-dedicated PDU session function based on each of the above-described procedures, and in a case that the emergency call-dedicated PDU session function is supported, the UE_A 10 transmits the IMS emergency call connection signal to the core network to which the UE_A 10 is connected by using the emergency call-dedicated PDU session. In a case that the emergency call-dedicated PDU session function is not supported, the IMS emergency call connection signal may be transmitted to another core network in the same PLMN by using the emergency call-dedicated PDU session.

Specifically, the UE_A 10 in the first state detects whether the core network supports the emergency call-dedicated PDU session function based on the network function information of the core network B_190 to which the UE_A 10 is connected, the information being acquired from the registration procedure or the broadcast information described above. In a case that the emergency call-dedicated PDU session function is supported, the registration procedure and/or the PDU session establishment procedure including information explicitly indicating the PDU session establishment dedicated to the emergency call are performed on the core network_B 190 (S1500 and S1502). In a case that the core network_B 190 to which the UE_A 10 is connected does not support the emergency call-dedicated PDU session function, the UE_A 10 confirms the service area location. At this time, in a case that the UE_A 10 is served in another network, the UE_A 10 may transmit to the core network_A 90 a registration signal including information explicitly indicating an emergency call-dedicated bearer or PDU session establishment based on the IMS reconnection policy held by the UE_A 10. Even in a case that the service area location of the UE_A 10 is the home network, the UE_A 10 may transmit to the core network_A 90 the registration signal including information explicitly indicating the PDU session establishment dedicated to the emergency call based on the IMS reconnection policy held by the UE_A 10. Alternatively, in a case that the core network A_90 supports the voice service function and the PDU session function dedicated to the emergency call based on the network function information of the core network A_90 acquired in the registration procedure, the UE_A 10 may transmit to the core network_A 90 the registration signal including information explicitly indicating the PDU session establishment dedicated to the emergency call. Alternatively, in a case that the reject or redirection message received by the UE_A 10 includes information that prompts another core network A_90 in the same PLMN supporting the voice service function and the emergency call-dedicated PDU session function to make an IMS emergency call connection, the UE_A 10 may transmit to the core network A_90 the registration signal including information explicitly indicating the PDU session establishment dedicated to the emergency call based on the received information. Note that the information explicitly indicating the PDU session establishment dedicated to the emergency call may be included in a single PDU session establishment request signal, or may be included in information regarding the PDU session establishment in the registration signal. The core network_A 90 that has received information explicitly indicating the PDU session establishment dedicated to the emergency call selects an external gateway that can handle the PDU session dedicated to the emergency call. The external gateway that can handle the PDU session dedicated to the emergency call selects the P-CSCF_B 310 that can handle the PDU session dedicated to the emergency call and transmits to the UE_A 10 a response to a request of establishment of the PDU session dedicated to the emergency call, the response including the address of the P-CSCF_B 310 that can handle the PDU session dedicated to the emergency call. Note that, in a case that the external gateway that can handle the PDU session dedicated to the emergency call is the same as the external gateway connected in a case that the UE_A 10 cannot recognize an emergency call and an IMS emergency call connection signal is transmitted, selection of an external gateway that can handle the PDU session dedicated to the emergency call by the core network_B 190, selection of the P-CSCF_B 310 that can handle the PDU session dedicated to the emergency call, and transmission of the address of the P-CSCF_B 310 to the UE_A 10 may not be performed.

Next, the UE_A 10 transmits an IMS registration signal dedicated to the emergency call to the P-CSCF_B 310 dedicated to the emergency call and requests an IMS registration procedure dedicated to the emergency call (S1504).

Specifically, the UE_A 10 transmits a REGISTER signal (S1504) that includes information explicitly indicating IMS registration for the emergency call connection in the Contact header to the P-CSCF_B 310 dedicated to emergency call. The P-CSCF_B 310 that has received the REGISTER signal transfers the REGISTER signal to the S-CSCF via the I-CSCF, the ATCF, or the IBCF based on the operator policy related to the service area information of the UE_A 10 and the signal path. The S-CSCF that has received the REGISTER signal detects the IMS registration for the emergency call connection based on the information explicitly indicating the IMS registration for the emergency call connection in the Contact header, creates IMS registration information by causing the contact address in the Contact header, the information explicitly indicating the IMS registration for the emergency call connection, and the public user identity to be registered to be associated with each other, and then holds the IMS registration information. The S-CSCF that has created the IMS registration information dedicated to the emergency call includes information indicating that the IMS registration for the emergency call connection has been completed in the Contact header and transmits "200 OK" to the UE_A 10.

Next, after completing the IMS registration for the emergency call connection, the UE_A 10 transmits the INVITE including information indicating an emergency call-dedicated signal to the P-CSCF_B 310 (S1506) and requests an SIP dialog forming dedicated to the emergency call.

Specifically, the UE_A 10 configures a path for the SIP signal based on path information received in the IMS registration for the emergency call connection, and transmits an INVITE signal in which an emergency service URN indicating an emergency call connection is configured in the request URI and the To header to the P-CSCF_B 310 dedicated to the emergency call for which a path has been configured (S1506). The P-CSCF_B 310 that has received the INVITE creates an emergency call-dedicated connection path, transfers the INVITE signal to the emergency station via the emergency call-dedicated CSCF (E-CSCF), or the like, and requests dialog forming dedicated to the emergency call. The P-CSCF_B 310 that has received notification of the successful dialog forming transmits "200 OK" for notifying the success of the dialog forming dedicated to the emergency call to the UE_A 10 (S1510).

1.4.4.2. Description of IMS Emergency Call Reconnection Procedure Using Normal PDU Session Next, an IMS emergency call reconnection procedure using a normal PDU session will be described using FIG. 15.

The UE_A 10 that has received the reject or redirection message from the IMS_A 7 detects whether the core network_B 190 to which the U E_A 10 is connected supports the emergency call-dedicated PDU session function, and in a case that the emergency call-dedicated PDU session function is not supported, and the UE_A 10 is served in the home network, UE_A 10 may transmit the IMS emergency call connection signal by using the normal PDU session. Alternatively, in a case that the reject or redirection message does not include information that prompts another core network_A 90 in the same PLMN supporting the voice service function and the emergency call-dedicated PDU session function to make the IMS emergency call connection, the UE_A 10 may transmit the IMS emergency call connection signal by using the normal PDU session.

Specifically, in a case that the connected core network B_190 acquired from the registration procedure or the broadcast information does not support the emergency call-dedicated PDU session function, the UE_A 10 checks the service area location. At this time, the UE_A 10 served in the home network transmits, based on the IMS reconnection policy held by the UE_A 10 or the network function information of the core network A_90 acquired in the registration procedure, a registration signal including the normal PDU session establishment request in a case that the core network A_90 supports the voice service function and does not support the emergency call-dedicated PDU session function, or the reject or redirection message received by the UE_A 10 does not include information that prompts the other core network A_90 in the same PLMN supporting the voice service function and the emergency call-dedicated PDU session function to make the IMS emergency call connection, and in a case that a default bearer for performing SIP signal processing is not established with respect to the core network_A 90.

Next, in a case that the UE_A 10 does not hold or recognize the public user identity in the IMS registration state, the UE_A 10 transmits a normal IMS registration signal to the P-CSCF dedicated to the emergency call and requests a normal IMS registration procedure.

Specifically, the UE_A 10 transmits to the P-CSCF a REGISTER signal for normal IMS registration (S1504). The P-CSCF that has received the REGISTER signal transfers the REGISTER signal to the S-CSCF via the I-CSCF, the ATCF, or the IBCF based on the operator policy related to the service area information of the UE_A 10 and the signal path. The S-CSCF that has received the REGISTER signal associates the contact address included in the Contact header with the public user identity to be registered to create and hold IMS registration information. The S-CSCF that has created the normal IMS registration information transmits to the UE_A 10 "200 OK" including information indicating that the IMS registration has been completed.

Next, after completing the normal IMS registration, the UE_A 10 transmits the INVITE signal including information indicating an emergency call-dedicated signal to the P-CSCF and requests an SIP dialog forming dedicated to the emergency call.

Specifically, the UE_A 10 configures a path for the SIP signal based on the path information received in the IMS registration for the emergency call connection, and transmits the INVITE signal in which an emergency service URN indicating an emergency call connection is configured in the request URI and the To header to the P-CSCF dedicated to an emergency call for which a path has been configured. The P-CSCF_B 310 that has received the INVITE transfers the INVITE signal to the emergency station via the signal path created in the IMS registration and the signal path for the emergency call connection, and requests normal dialog forming. The P-CSCF_B 310 that has received notification of the success of the dialog forming transmits "200 OK" for notifying the success of the normal dialog forming to the UE_A 10 (S1510).

1.4.5.3. Description of CS Emergency Call Connection Procedure

Next, a CS emergency call connection procedure will be described.

The UE_A 10 that has received a reject or redirection message from the IMS_A 7 detects whether the core network to which the UE_A 10 is connected supports the emergency call-dedicated PDU session function, and in a case that the core network does not support the emergency call-dedicated PDU session function and in a case that another core network in the same PLMN does not support the voice service function, or in a case that the other core network in the same PLMN supports the voice service function and does not support the emergency call-dedicated PDU session function, the UE_A 10 may make a Circuit Switching (CS) emergency call connection.

Specifically, in a case that the UE_A 10 detect that the core network to which the UE_A 10 attempts to connect or has been connected does not support the emergency call-dedicated PDU session function based on the registration procedure or the broadcast information, and in addition another core network in the same PLMN does not support the voice service function based on the network function information or network capability information of the other core network in the same PLMN acquired in the registration procedure described above, the UE_A 10 may perform the CS emergency call connection.

In a case that another core network in the same PLMN supports the voice service function and does not support the emergency call-dedicated PDU session function based on the network function information of the other core network in the same PLMN acquired in the registration procedure, the UE_A 10 checks the service area location. At this time, the CS emergency call connection may be made in a case that the UE_A 10 is served in another network.

In addition, in a case that the redirection message does not include information that prompts the other core network in the same PLMN supporting the voice service function and the emergency call-dedicated PDU session function to make the IMS emergency call connection, the UE_A 10 checks the service area location. At this time, the CS emergency call connection may be made in a case that the UE_A 10 is served in another network.

1.5. Others

The method has been described, in which the UE_A 10 completes the registration procedure with respect to the core network_B 190, then switches to another network in the same PLMN, for example, the core network_A 90, and then performs the IMS emergency call reconnection procedure; however, the invention is not limited thereto, and the UE_A 10 may complete the registration procedure with respect to the core network_A 90, then switch to another network in the same PLMN, for example, the core network_B 190, and then perform the IMS emergency call reconnection procedure. This procedure is the same as the procedure described above, and thus description thereof will be omitted.

2. Modified Examples

A program running on an apparatus according to the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such the functions of the embodiment according to the present invention may be recorded on a computer-readable recording medium. This configuration may be realized by causing a computer system to read the program recorded on the recording medium and to perform the program. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium dynamically holding the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a known processor, a controller, a microcontroller, or a state machine. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
7 IMS_A
10 UE_A
20 UTRAN_A
22 NB_A
24 RNC_A
25 GERAN_A
26 BSS_A
30 PGW_A
35 SGW_A
45 eNB_A
40 MME_A
50 HSS_A
70 WLAN ANa
75 WLAN ANb
80 E-UTRAN_A
90 Core network_A
120 5G-RAN_A
122 NR node_A
125 WLAN ANc
126 WAG_A
190 Core network_B
230 SMF_A 235 UPF_A
240 AMF_A
245 UDM_A
300 P-CSCF_A
310 P-CSCF_B
320 S-CSCF_A
330 E-CSCF_A

The invention claimed is:

1. A User Equipment (UE) comprising:
a controller that:
triggers a core network change from a 5G System (5GS) to an Evolved Packet System (EPS), in a case that the UE receives information indicating a support of emergency service via the EPS from an Access and Mobility Management Function (AMF), and
establishes an emergency connection via the EPS after the core network change.

2. A communication method performed by a User Equipment (UE), the communication method comprising:
triggering a core network change from a 5G System (5GS) to an Evolved Packet System (EPS), in a case that the UE receives information indicating a support of emergency service via the EPS from an Access and Mobility Management Function (AMF), and
establishing an emergency connection via the EPS after the core network change.

3. A User Equipment (UE) comprising:
a controller that:
initiates a transmission of a registration request message;
triggers a core network change from a 5G System (5GS) to an Evolved Packet System (EPS), in a case that the UE receives an indication from an Access and Mobility Management Function (AMF) that emergency service is supported by an all-internet protocol network with an Evolved Packet Core (EPC), wherein the indication from the AMF is received in response to the registration request message, and
establishes an emergency connection via the EPS after the core network change.

4. The UE of claim 3, wherein the indication from the AMF that emergency service is supported is received in a registration accept message that is a non-access-stratum (NAS) message.

5. The UE of claim 3, wherein the indication from the AMF that emergency service is supported is received during a registration procedure of the UE.

6. The UE of claim 3, wherein the indication from the AMF that emergency service is supported is received in an emergency call connection procedure.

* * * * *